United States Patent
Minegishi et al.

(10) Patent No.: US 7,908,524 B2
(45) Date of Patent: Mar. 15, 2011

(54) STORAGE MEDIUM READABLE BY A MACHINE TANGIBLE EMBODYING EVENT NOTIFICATION MANAGEMENT PROGRAM AND EVENT NOTIFICATION MANAGEMENT APPARATUS

(75) Inventors: Akira Minegishi, Kawasaki (JP); You-ichi Iwakura, Maebashi (JP); Ken-ichi Ishikawa, Kaebashi (JP)

(73) Assignee: Fujitsu Limited, Kawasaki (JP)

( * ) Notice: Subject to any disclaimer, the term of this patent is extended or adjusted under 35 U.S.C. 154(b) by 487 days.

(21) Appl. No.: 11/236,534

(22) Filed: Sep. 28, 2005

(65) Prior Publication Data

US 2006/0212743 A1     Sep. 21, 2006

(30) Foreign Application Priority Data

Mar. 15, 2005  (JP) .................... 2005-073612

(51) Int. Cl.
    *G06F 11/00* (2006.01)
(52) U.S. Cl. ............... 714/48; 714/4; 714/47; 725/101; 739/318
(58) Field of Classification Search .............. 714/48, 714/4, 47; 725/101; 719/318
    See application file for complete search history.

(56) References Cited

U.S. PATENT DOCUMENTS

| | | | |
|---|---|---|---|
| 5,592,664 A * | 1/1997 | Starkey ............................. | 707/1 |
| 5,655,081 A | 8/1997 | Bonnell et al. | |
| 5,682,325 A * | 10/1997 | Lightfoot et al. ............. | 709/229 |
| 5,828,882 A * | 10/1998 | Hinckley ...................... | 719/318 |
| 5,903,568 A | 5/1999 | Tanaka et al. ................ | 370/469 |
| 5,936,659 A * | 8/1999 | Viswanathan et al. ........ | 725/103 |
| 5,942,986 A * | 8/1999 | Shabot et al. ................ | 340/7.29 |
| 6,070,190 A * | 5/2000 | Reps et al. ..................... | 709/224 |
| 6,167,538 A * | 12/2000 | Neufeld et al. ................. | 714/47 |
| 6,185,613 B1* | 2/2001 | Lawson et al. ............... | 709/224 |
| 6,237,114 B1* | 5/2001 | Wookey et al. ................. | 714/47 |
| 6,421,737 B1* | 7/2002 | Stone et al. .................... | 719/318 |
| 6,715,083 B1* | 3/2004 | Tovander ....................... | 726/23 |

(Continued)

FOREIGN PATENT DOCUMENTS

EP      1 494 118 A2     1/2005

(Continued)

OTHER PUBLICATIONS

Notice of Reasons for Refusal from Korean Patent Office dated Oct. 31, 2006 in corresponding Korean Patent Application No. 10-2005-0061121.

(Continued)

*Primary Examiner* — Scott T Baderman
*Assistant Examiner* — Loan Truong
(74) *Attorney, Agent, or Firm* — Staas & Halsey LLP

(57) ABSTRACT

An event notification management program 110 makes a computer function as processing means for controlling notification, given to a predetermined system 200, of information about an event occurred within the system 100 that is acquired from notification information provided from a component (20, 30, 40) within the system 100. The processing means has a function of determining a content of a notification process corresponding to the event acquired from the provided notification information on the basis of management information (FIG. 19) in which event identifying information specifying the event is associated with the content of the notification process (S102), and controlling the notification, given to the predetermined system, of the information about the event in accordance with the content of the notification process (S104, S105).

9 Claims, 24 Drawing Sheets

U.S. PATENT DOCUMENTS

| | | | |
|---|---|---|---|
| 6,769,079 B1 | 7/2004 | Currey et al. | |
| 6,792,456 B1 | 9/2004 | Hellerstein et al. | |
| 6,844,832 B2* | 1/2005 | Koike | 341/55 |
| 6,862,619 B1* | 3/2005 | Sugauchi et al. | 709/224 |
| 6,862,698 B1 | 3/2005 | Shyu | |
| 6,925,586 B1* | 8/2005 | Perrella et al. | 714/57 |
| 6,973,667 B2* | 12/2005 | Fritsch | 725/88 |
| 7,143,431 B1* | 11/2006 | Eager et al. | 725/101 |
| 7,155,735 B1* | 12/2006 | Ngo et al. | 725/101 |
| 7,206,975 B1* | 4/2007 | Wilding | 714/47 |
| 7,209,186 B2* | 4/2007 | Izawa | 348/714 |
| 7,308,714 B2* | 12/2007 | Bardsley et al. | 726/23 |
| 7,373,552 B2* | 5/2008 | Bjorsne | 714/37 |
| 7,516,368 B2* | 4/2009 | Kobayashi et al. | 714/39 |
| 2002/0124213 A1 | 9/2002 | Ahrens, Jr. et al. | |
| 2002/0124214 A1* | 9/2002 | Ahrens et al. | 714/57 |
| 2003/0001737 A1 | 1/2003 | Shiratori et al. | |
| 2003/0023722 A1* | 1/2003 | Vinberg | 709/224 |
| 2003/0033595 A1* | 2/2003 | Takagi et al. | 717/143 |
| 2003/0149761 A1* | 8/2003 | Baldwin et al. | 709/224 |
| 2003/0225913 A1* | 12/2003 | Bussler et al. | 709/246 |
| 2003/0233435 A1 | 12/2003 | Bazinet et al. | |
| 2004/0068481 A1* | 4/2004 | Seshadri et al. | 707/1 |
| 2004/0068561 A1 | 4/2004 | Yamamoto et al. | |
| 2004/0088715 A1* | 5/2004 | Korall et al. | 719/318 |
| 2004/0132448 A1* | 7/2004 | Torres et al. | 455/427 |
| 2004/0186693 A1* | 9/2004 | Xiang et al. | 702/188 |
| 2004/0223485 A1* | 11/2004 | Arellano et al. | 370/351 |
| 2005/0015685 A1 | 1/2005 | Yamamoto | |
| 2005/0055699 A1* | 3/2005 | Rosenthal et al. | 719/310 |
| 2005/0144483 A1* | 6/2005 | Robertson et al. | 713/201 |
| 2005/0166099 A1 | 7/2005 | Shyu | |
| 2005/0183143 A1* | 8/2005 | Anderholm et al. | 726/22 |
| 2005/0235058 A1* | 10/2005 | Rackus et al. | 709/224 |
| 2005/0278708 A1* | 12/2005 | Zhao et al. | 717/136 |
| 2006/0129877 A1 | 6/2006 | Yamamoto et al. | |
| 2006/0159117 A1* | 7/2006 | Furlong et al. | 370/432 |
| 2006/0212751 A1 | 9/2006 | Yamamoto et al. | |
| 2006/0230306 A1* | 10/2006 | Richards et al. | 714/7 |
| 2008/0276120 A1 | 11/2008 | Yamamoto et al. | |

FOREIGN PATENT DOCUMENTS

| | | |
|---|---|---|
| JP | 56-059357 | 5/1981 |
| JP | 03-172038 | 7/1991 |
| JP | 6-222957 | 8/1994 |
| JP | 06-250887 | 9/1994 |
| JP | 11-184732 | 9/1994 |
| JP | 8-106407 | 4/1996 |
| JP | 2003-124933 | 4/2003 |
| JP | 2003-248856 | 9/2003 |

OTHER PUBLICATIONS

Office Action dated Feb. 15, 2008 in corresponding Chinese Patent Application No. 2005100844720 (15 pages).*

European Search Report, mailed Aug. 6, 2008 and issued in corresponding European Patent Application No. 05253586.1-1225.

European Search Report Communication issued by the European Patent Office on Nov. 18, 2008 in European Patent Application No. 05253586.1-1225 / 1703394, including the Annex to the European Search Report (4 pages).*

Notice of Reason for Rejection dated Aug. 25, 2009 issued in the corresponding Japanese application No. 2005-073612 (3 pages), English translation (4 pages).

* cited by examiner

FIG. 2

```
<IDENTIFIER = REGULAR EXPRESSION SYNTAX>
Msg111=*Overflow buffer.
Msg123=*is not ready.
Msg199=*not present.
          ⋮
```

FIG. 3

```
[IDENTIFIER]
REGEXP=<REGULAR EXPRESSION SYNTAX>
HEADER=<VALUE OF COMMONIZED DATA FORMAT, STORAGE POSITION>
ID=<VALUE OF COMMONIZED DATA FORMAT, STORAGE POSITION>
DATA_cnt=< DATA COUNT>
DATA*=<ARRANGEMENT POSITION OF DATA TO BE EXTRACTED FROM
NOTIFICATION DATA, STORAGE POSITION IN COMMONIZED
DATA FORMAT>
```

FIG. 6

```
[IDENTIFIER]
REGEXP=<REGULAR EXPRESSION SYNTAX>
HEADER=<VALUE OF COMMONIZED DATA FORMAT, STORAGE POSITION>
ID=<VALUE OF COMMONIZED DATA FORMAT, STORAGE POSITION>
DATA_Cnt=< DATA COUNT>
DATA*=<*-TH HEAD/LAST POSITIONS OF RESULT OF
FITTING, STORAGE POSITION IN COMMONIZED DATA FORMAT>
                                        ↓
            DATA EXTRACTION/EDIT CONDITIONS
```

FIG. 12

```
[IDENTIFIER]
REGEXP=<REGULAR EXPRESSION SYNTAX, CONTINUOUS IDENTIFIER>
HEADER=<VALUE OF COMMONIZED DATA FORMAT, STORAGE POSITION>
ID=<VALUE OF COMMONIZED DATA FORMAT, STORAGE POSITION>
DATA_cnt=< DATA COUNT>
DATA* =<*-TH HEAD/LAST POSITIONS OF RESULT OF
FITTING, STORAGE POSITION IN COMMONIZED DATA FORMAT>
                                │
                                ▼
            DATA EXTRACTION/EDIT CONDITIONS
```

FIG.13

[Msg123]
RegExp = Device [0-9] is not ready., Msg 199
Header = value X, 1
ID = value Y, 2
Data Cnt = 1
Data 1 = 2, 3

[Msg199]
 . . . . .

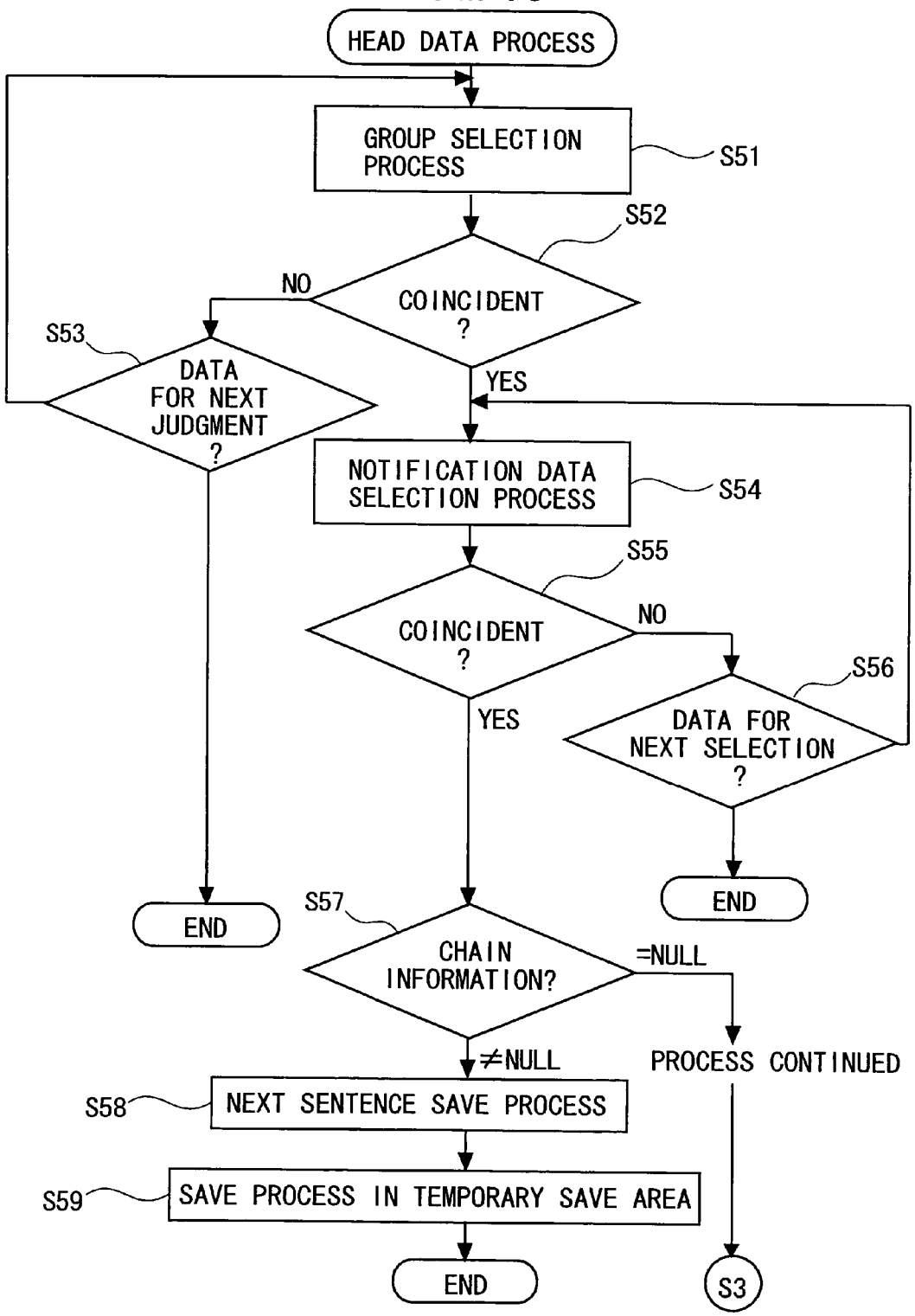

FIG. 16

| ITEM NUMBER | INFORMATION | CONTENTS |
|---|---|---|
| 1 | TYPE (COMMON) | INFORMATION FOR IDENTIFYING EVENT |
| 2 | NOTIFICATION PROCESSING MEANS (FIRST-ORDER PROCESS) | SNMP TRAP, E-MAIL, SECOND-ORDER PROCESS, ETC. |
| 3 | NOTIFICATION PROCESSING MEANS (SECOND-ORDER PROCESS) | SNMP TRAP, E-MAIL, ETC. |
| 4 | OCCURRENCE COUNT UPPER LIMIT VALUE (SECOND-ORDER PROCESS) | OCCURRED EVENT COUNT UPPER LIMIT VALUE |
| 5 | MONITORING TIME (INTERVAL) (SECOND-ORDER PROCESS) | OCCURRED EVENT MONITORING TIME |
| 6 | RESTRAINING TIME (SECOND-ORDER PROCESS) | NOTIFICATION IS RESTRAINED IF DESIGNATED TIME DOES NOT ELAPSE SINCE TIME WHEN NOTIFICATION WAS DONE LAST TIME. |
| 7 | OCCURRENCE COUNT (SECOND-ORDER PROCESS) | EVENT OCCURRENCE COUNT |
| 8 | NOTIFICATION EFFECTION TIME (SECOND-ORDER PROCESS) | NOTIFICATION EFFECTUATED TIME (0 SHOWING NON-EFFECTUATION) |
| 9 | OCCURRENCE TIME (SECOND-ORDER PROCESS) | EVENT OCCURRED TIME |

FIG. 21A

| 1 | TYPE = A |
|---|---|
| 4 | OCCURRENCE COUNT UPPER LIMIT VALUE = 3 |
| 5 | MONITORING TIME = 60 MIN |
| 7 | OCCURRENCE COUNT = 0 |
| 8 | NOTIFICATION EFFECTUATION TIME = 0 |
| 9 | OCCURRENCE TIME (QUEUE) |
| 3 | NOTIFICATION PROCESSING MEANS = E-MAIL |
| 6 | RRESTRAINING TIME = 60 MIN |

FIG. 21B

| 1 | TYPE = A | |
|---|---|---|
| 4 | OCCURRENCE COUNT UPPER LIMIT VALUE = 3 | |
| 5 | MONITORING TIME = 60 MIN | |
| 7 | OCCURRENCE COUNT = 1 | |
| 8 | NOTIFICATION EFFECTUATION TIME = 0 | |
| 9 | OCCURRENCE TIME (QUEUE) | 7:30 |
| 3 | NOTIFICATION PROCESSING MEANS = E-MAIL | |
| 6 | RRESTRAINING TIME = 60 MIN | |

FIG. 22A

| 1 | TYPE = A |  |
|---|---|---|
| 4 | OCCURRENCE COUNT UPPER LIMIT VALUE = 3 | |
| 5 | MONITORING TIME = 60 MIN | |
| 7 | OCCURRENCE COUNT = 2 | |
| 8 | NOTIFICATION EFFECTUATION TIME = 0 | |
| 9 | OCCURRENCE TIME (QUEUE) | 7:30→7:31 |
| 3 | NOTIFICATION PROCESSING MEANS = E-MAIL | |
| 6 | RRESTRAINING TIME = 60 MIN | |

FIG. 22B

| 1 | TYPE = A |  |
|---|---|---|
| 4 | OCCURRENCE COUNT UPPER LIMIT VALUE = 3 | |
| 5 | MONITORING TIME = 60 MIN | |
| 7 | OCCURRENCE COUNT = 3 | |
| 8 | NOTIFICATION EFFECTUATION TIME = 0 | |
| 9 | OCCURRENCE TIME (QUEUE) | 7:30→7:31→7:45 |
| 3 | NOTIFICATION PROCESSING MEANS = E-MAIL | |
| 6 | RRESTRAINING TIME = 60 MIN | |

FIG. 23A

| 1 | TYPE = A |  |
|---|---|---|
| 4 | OCCURRENCE COUNT UPPER LIMIT VALUE = 3 |  |
| 5 | MONITORING TIME = 60 MIN |  |
| 7 | OCCURRENCE COUNT = 3 |  |
| 8 | NOTIFICATION EFFECTUATION TIME = 7:45 |  |
| 9 | OCCURRENCE TIME (QUEUE) | 7:30→7:31→7:45 |
| 3 | NOTIFICATION PROCESSING MEANS = E-MAIL |  |
| 6 | RRESTRAINING TIME = 60 MIN |  |

FIG. 23B

| 1 | TYPE = A |  |
|---|---|---|
| 4 | OCCURRENCE COUNT UPPER LIMIT VALUE = 3 |  |
| 5 | MONITORING TIME = 60 MIN |  |
| 7 | OCCURRENCE COUNT = 4 |  |
| 8 | NOTIFICATION EFFECTUATION TIME = 7:45 |  |
| 9 | OCCURRENCE TIME (QUEUE) | 7:31→7:45→8:40 |
| 3 | NOTIFICATION PROCESSING MEANS = E-MAIL |  |
| 6 | RRESTRAINING TIME = 60 MIN |  |

FIG. 24A

| 1 | TYPE = A |
|---|---|
| 4 | OCCURRENCE COUNT UPPER LIMIT VALUE = 3 |
| 5 | MONITORING TIME = 60 MIN |
| 7 | OCCURRENCE COUNT = 4 |
| 8 | NOTIFICATION EFFECTUATION TIME = 7:45 |
| 9 | OCCURRENCE TIME (QUEUE) | 7:31→7:45→8:40 |
| 3 | NOTIFICATION PROCESSING MEANS = E-MAIL |
| 6 | RRESTRAINING TIME = 60 MIN |

FIG. 24B

| 1 | TYPE = A |
|---|---|
| 4 | OCCURRENCE COUNT UPPER LIMIT VALUE = 3 |
| 5 | MONITORING TIME = 60 MIN |
| 7 | OCCURRENCE COUNT = 5 |
| 8 | NOTIFICATION EFFECTUATION TIME = 7:45 |
| 9 | OCCURRENCE TIME (QUEUE) | 7:45→8:40→8:41 |
| 3 | NOTIFICATION PROCESSING MEANS = E-MAIL |
| 6 | RRESTRAINING TIME = 60 MIN |

STORAGE MEDIUM READABLE BY A MACHINE TANGIBLE EMBODYING EVENT NOTIFICATION MANAGEMENT PROGRAM AND EVENT NOTIFICATION MANAGEMENT APPARATUS

BACKGROUND OF THE INVENTION

The invention relates to an event notification management program and an event notification management apparatus that manage notification of information about an event occurred within a system such as a personal computer, a server, a variety of software, etc..

There has hitherto been proposed management software (program) for managing notification of information about an event occurred within a system such as a computer etc. (refer to, e.g., Patent document 1). This management software acquires an information (communication information) log about abnormality such as a fault etc. from respective components such as hardware, software, firmware, etc. within the system such as the computer etc., and controls the notification, given to a predetermined management system, of the event, wherein occurrence time thereof, a type (OS, a type of software, degree of importance (hazard, alarm, information, etc.) are used as keywords. With this operation, if the hardware in the system gets into a fault, an administrator terminal (server) is notified of this fault via, e.g., an e-mail.

According to this type of management software, the administrator and a system user can judge by checking this notification whether the system normally operates or not.

SUMMARY OF THE INVENTION

By the way, the conventional management software is, whenever obtaining the notification log from the component within the system, configured to notify of an intra-system event acquired from the notification information. The events within the system are not necessarily those each exhibiting high urgency requiring the administrator to be notified of the event immediately after the occurrence, while there might be a case in which the events occurred for a considerable period of time are accumulated, and it is proper to notify of a result thereof.

Nevertheless, the conventional software, when acquiring the notification information from each component, notifies of the event corresponding thereto, and hence, if the events having no necessity for immediate notifications thereof increase, a communication cost rises. Further, the administrator also must check even the notifications originally having no necessity of being checked. Therefore, the system can not be efficiently managed.

It is an object of the invention, which was made to solve the problems of the prior arts, to provide an event notification management program enabling the efficient management of the system.

An event notification management program according to the invention makes a computer function as a processing apparatus controlling notification to a predetermined system, of information about an event occurred within a system that is acquired from notification information provided from a component within the system, wherein the processing apparatus has a function of determining a content of a notification process corresponding to the event acquired from the provided notification information on the basis of management information in which event identifying information specifying the event is associated with the content of the notification process, and controlling the notification to the predetermined system, of the information about the event in accordance with the content of the notification process.

With this configuration, the notification, given to the predetermined system, of the information about the event is controlled based on the content of the notification process associated with the event, and it is therefore possible to control the notification corresponding to urgency etc. of the event.

The management target system may be a computer such as a server, a terminal, etc., may also be particularly software within the computer, and may further be a network system configured by a plurality of computers and a network. Moreover, the intra-system component for providing the notification information may be any one of hardware, software and firmware. Further, the predetermined system notified of the information about the event may be the computer such as the server, the terminal, etc. and may also be the software installed into the computer.

Moreover, in the event notification management program according to the invention, the processing apparatus includes a first processing unit and a second processing unit, the content of the notification process contains at least designating information of a notification processing unit employed for the first processing unit to notify of the information about the event, and a notification condition, the first processing unit has a function of determining the notification processing unit corresponding to the event acquired from the provided notification information, and instructing the determined notification processing unit to notify of the information about the event, and the second processing unit has a function of controlling, when the notification processing unit determined by the first processing means is the second processing means, the notification of the information about the event in accordance with the notification condition.

With this configuration, the first processing unit and the second processing unit can hierarchically control the notification of the event occurred within the system.

In the event notification management program according to the invention, the processing means includes a format converting unit converting the notification information provided from the component within the system into a predetermined format. The content of the notification process corresponding to the event acquired from the notification information is determined, and the notification to the processing system, of the information about the event is controlled in accordance with the content of the notification process.

With such a configuration, even when the notification information taking a variety of formats is provided from the components within the system, it is possible to control the notification of the information about the event on the basis of the notification information unified in the predetermined format. Hence, the notification control process can be efficiently executed.

Furthermore, in the event notification management program according to the invention, the format converting unit can include syntax selection unit selecting, from a plurality of syntaxes, a syntax for expressing the notification information provided from the component within the system, a unique part information extracting unit extracting unique part information contained in the notification information expressed by the selected syntax, and an editing unit editing the notification information in the predetermined format that contains identifying information associated with the selected syntax and the extracted unique part information.

With such a configuration, it is feasible to acquire the information expressed in the predetermined format that contains the identifying information of the syntax expressing the notification information provided from the component within the system and the unique part information contained in the notification information. The original notification information can be reproduced based on the syntax identifying information contained in the predetermined formatted information and the unique part information of the notification information.

Moreover, the invention may take such a form that a recording medium readable by a computer etc. is recorded with a program for making the computer, other device, machine, etc. actualize any one of the functions described above. Further, the invention may be a network management method by which the computer, other device, machine, etc. execute any one of the processes described above.

Furthermore, the invention may be an event notification management apparatus including the functions given above. For example, according to the invention, an event notification management apparatus controlling notification to a predetermined system, of information about an event occurred within a system that is acquired from notification information provided from a component within the system, comprises a storage unit storing management information in which event identifying information specifying the event is associated with a content of a notification process, and a processing unit determining the content of the notification process corresponding to the event acquired from the provided notification information, and controlling the notification to the predetermined system, of the information about the event in accordance with the content of the notification process.

The event notification management program according to the invention controls the notification, given to the predetermined system, of the information about the event in accordance with the content of the notification process associated with the event, and can, as a result, control the notification corresponding to urgency etc. of the event, thereby enabling efficient management of the system.

BRIEF DESCRIPTION OF THE DRAWINGS

FIG. 2 is a diagram showing a regular expression syntax defined in a setting file employed by a 0th-order filter processing unit of an event notification management program in the system shown in FIG. 1, FIG. 3 is a diagram showing index information defined in a regular expression process, FIG. 6 is a diagram showing another example of the index information defined in the regular expression process, FIG. 12 is a diagram showing still another example of the index information defined in the regular expression process, FIG. 13 is a diagram showing more specifically the index information shown in FIG. 12, FIG. 15 is a flowchart (part 2) showing a procedure of the processes executed in the 0th-order filter processing unit when plural pieces of notification data are provided in division, FIG. 16 is a diagram showing the management information used by the first-order filter processing unit and the second-order filter processing unit in the system shown in FIG. 1, FIG. 21A and 21B are diagrams showing a specific status (part 1) of the management information table used by the second-order filter processing unit, FIG. 22A and 22B are diagrams showing a specific status (part 2) of the management information table used by the second-order filter processing unit, FIG. 23A and 23B are diagrams showing a specific status (part 3) of the management information table used by the second-order filter processing unit, FIG. 24A and 24B are diagrams showing a specific status (part 4) of the management information table used by the second-order filter processing unit.

DETAILED DESCRIPTION OF THE INVENTION

An embodiment of the invention will hereinafter be described with reference to the drawings.

Figure 1:
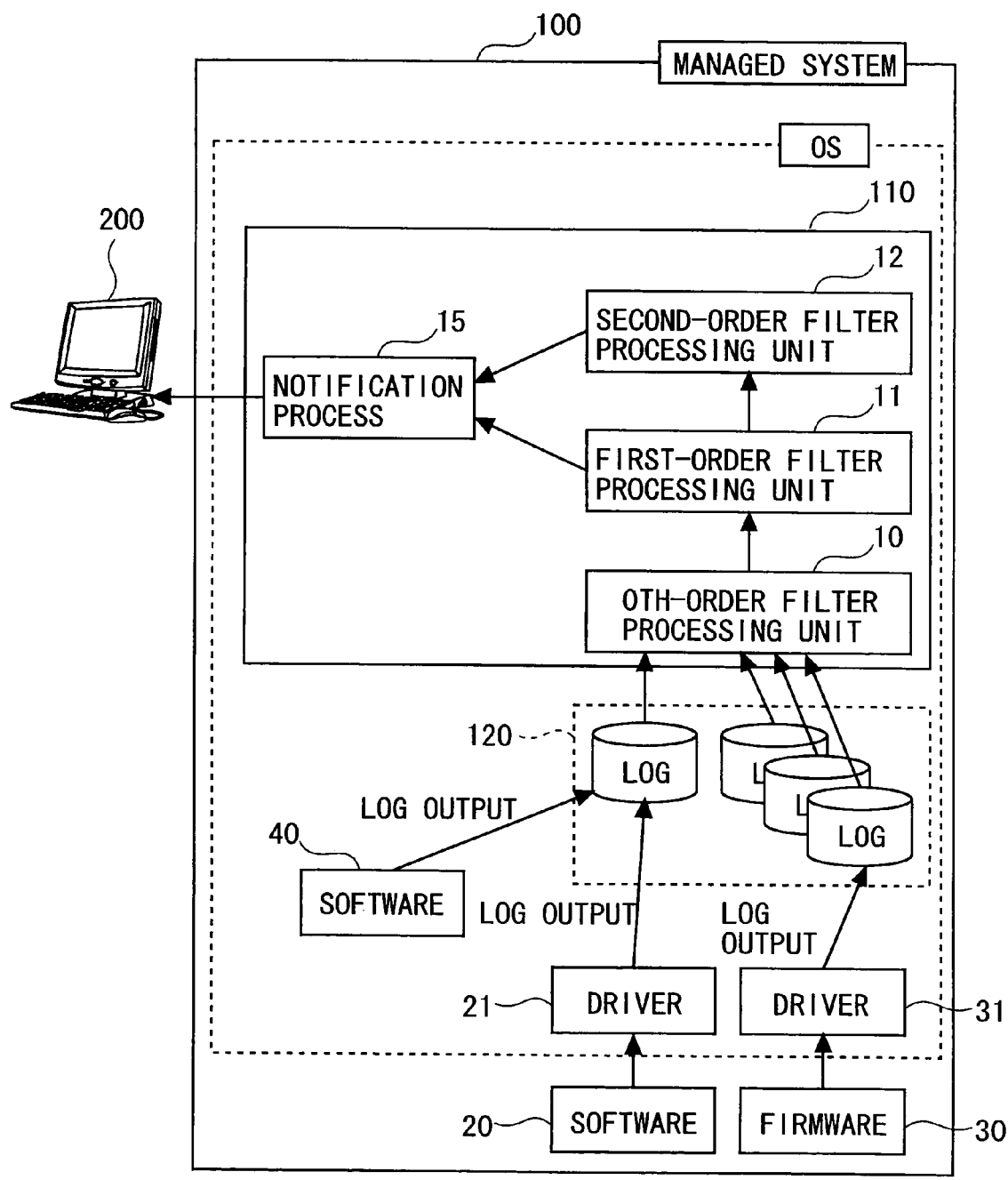
FIG. 1 is a diagram showing a configuration of a system to which an event notification management program according one embodiment of the invention is applied.

A system to which an event notification management program according to one embodiment of the invention is applied, is configured as shown in FIG. 1.

In FIG. 1, a managed system 100 (e.g., a server) is preinstalled with an event notification management program 110. This event notification management program 110 is included in an OS (Operation System) of the managed system 100, and is executed by a control unit (CPU) of the managed system 100. The event notification management program 110 includes a 0th-order filter processing unit 10, a first-order filter processing unit 11, a second-order filter processing unit 12 and a notification processing unit 15.

Hardware 20 and firmware 30 as respective components of the managed system 100 provide the OS with operation states as notification data. A log collecting unit 120 collects, as log information, pieces of notification data provided from the hardware 20 and the firmware 30 via drivers 21, 31. Further, the log collecting unit 120 collects, as log information, notification data given from software (program) 40 within the managed system 100. The notification data provided from the respective components such as the hardware 20, the firmware 30 and the software 40 can take formats defined independently by the respective components.

The 0th-order filter processing unit 10 converts the notification data taking the variety of forms, which have been collected as the log information by the log collecting unit 120 from the hardware 20, the firmware 30 and the software 40, into data in a predetermined format (commonized data format). The first-order filter processing unit 11 determines a notification processing means of an event occurred within the managed system 100, which is acquired from the notification data in the commonized data format, and instructs the thus-determined notification processing means to notify of information about the event. For example, if the determined notification processing means is a notification processing unit 15 (an e-mail, SNMP Trap (Simple Network Management Protocol Trap message), etc.), the notification processing unit 15 notifies an administrator terminal 200 of the information about the event, and, if the determined notification processing means is the second-order filter processing unit 12, it follows that a communication processing unit 15 notifies the administrator terminal 200 of the information about the event through a process in the second-order filter processing unit 12.

The second-order filter processing unit 12, if the notification processing means of the information about the event occurred within the managed system 100 that was determined by the first-order filter processing unit 11 is the second-order filter processing unit 12, controls the notification of the information about the event. Thus, the notification of the information about the event is controlled hierarchically by the first-order filter processing unit 11 and the second-order filter processing unit 12.

A process in the 0th-order filter processing unit 10 will specifically be explained.

The 0th-order filter processing unit 10 has a setting file (stored on an unillustrated storage unit) in which, as shown in FIG. 2, a plurality of regular expression syntaxes each associated with an identifier are defined, and executes a regular expression process upon the notification data provided as the log information from each of the components of the managed system 100. This regular expression process involves using data associated with pieces of index information (RegExp, Header, ID, Data Cnt, Data*) defined as shown in FIG. 3. Note that the [Identifier] in FIG. 3 is an identifier (such as Msg 111, Msg 123, etc.) for specifying the regular expression syntax defined as shown in FIG. 2, [RegExp] represents the regular expression syntax, [Header] and [ID] indicate an specific value of the regular expression syntax specified by [RegExp] and a storage position of this value in the commonized data format, [Data Cnt] shows the number of unique parts (Data) of the notification data expressed by the regular expression syntax,[Data*] indicates an array position of the unique part on the notification data and a storage position of the unique part in the commonized data format.

Figure 4:
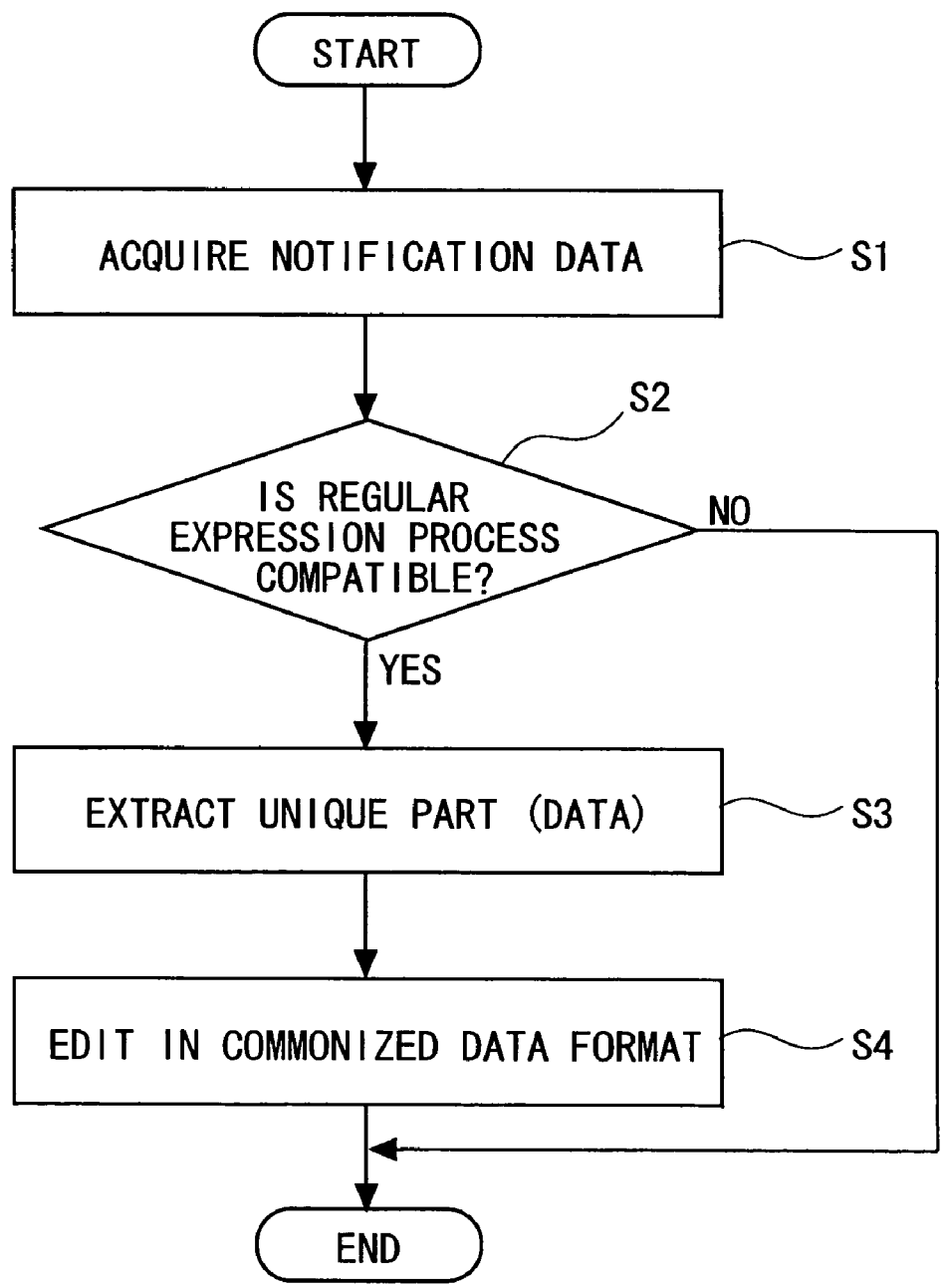
FIG. 4 is a flowchart showing one example of a processing procedure in the 0th-order filter processing unit.

The 0th-order filter processing unit 10 executes the processing in accordance with a procedure shown in FIG. 4.

In FIG. 4, the 0th-order filter processing unit 10, when acquiring the notification data (S1), executes the regular expression process, and selects the regular expression syntax expressing the notification data, i.e., the regular expression syntax compatible with the notification data is selected from the plurality of regular expression syntaxes defined in the setting file (see FIG. 2) (S2). When the compatible regular expression syntax is selected (YES in S2), the 0th-order filter processing unit 10 sets a value for the index information (FIG. 3).

Figure 5:
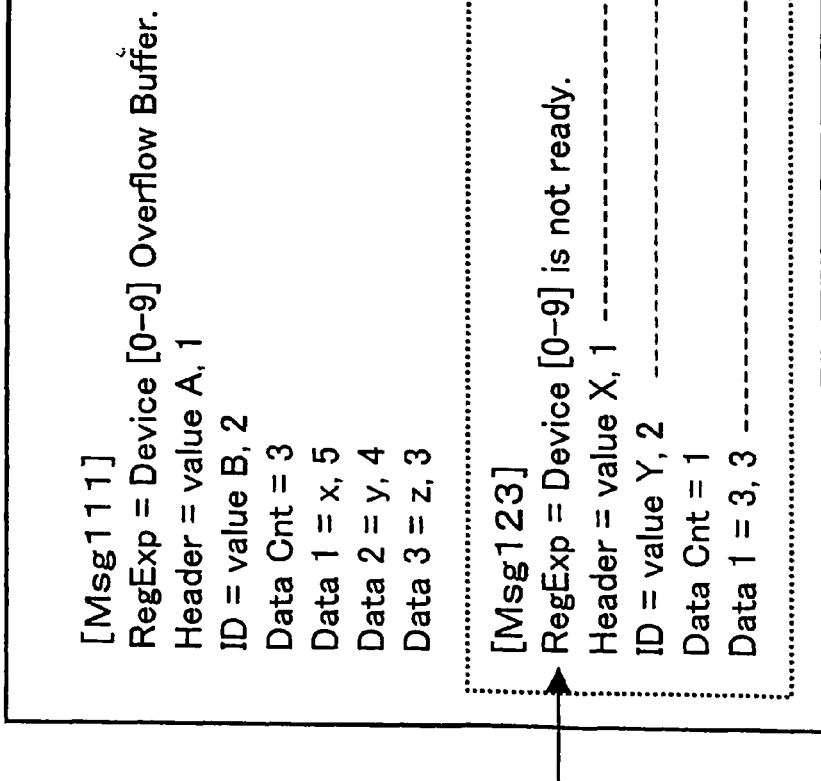
FIG. 5 is a diagram showing a process of converting notification data into a commonized data format.

For example, as shown in FIG. 5, in a case where the notification data is [Device id 7 is not ready.], the regular expression syntax (identifier=Msg 123) such as [Device id [0-9] is not ready.] compatible with the notification data is selected from the plurality of regular expression syntaxes. Then, there are set a Header value (value X) unique to the regular expression syntax, a storage position [1] in the commonized data format, an ID value (value Y) unique to the regular expression syntax and a storage position [2] in the commonized data format, respectively.

Subsequently, the 0th-order filter processing unit 10 extracts, based on Data 1=3, 3, a unique part [7] (a third single word) positioned third in the notification data [Device id 7 is not ready.] expressed by the regular expression syntax (S3). Herein, Data 1=3, 3 represents the designation that "the third single word in the regular expression is extracted and is set in the third element in an array of the commonized data format". Then, the 0th-order filter processing unit 10 stores the extracted value in the commonized data format. Further, the 0th-order filter processing unit 10 extracts the single data according to DATA Cnt=1, and terminates the process.

The 0th-order filter processing unit 10, as explained above, upon an end of setting the respective values of the index information, edits the data in the commonized data format corresponding to the notification data on the basis of the values that are set corresponding to the index information (S4) Namely, the notification data are converted into the commonized data format. In the case of the example shown in FIG. 5, the Header value "value X" is stored in the first storage position in the commonized data format, the ID value "value Y" is stored in the second storage position in the commonized data format, and the unique part [7] of the notification data is stored in the third storage position in the commonized data format. Through this process, the notification data are converted into data (value X, value Y,"7", ...) in the commonized data format. Namely, the notification data (Device id 7 is not ready.) can be specified by the data (value X, value Y,"7", ... ) in the commonized data format.

Note that if there is no regular expression syntax compatible with the notification data in the plurality of regular expression syntaxes defined in the setting file (NO in S2), the notification data are not converted into the commonized data format. Moreover, the processes (S2-S4) are executed for all the notification data acquired.

By the way, in the regular expression process, as a result of the compatibility between the regular expression syntax and the notification data, there are obtained the head position (the head character position) and the last position (the last character position) on the notification data conforming with a predetermined compatible condition. The notification data can be also converted into the commonized data format by making use of such a fitting result.

In this case, as shown in FIG. 6, the index information Data* represents that the *th fitting result is the unique part of the notification data and also shows that storage position of this unique part in the commonized data format, and other index information (RegExp, Header, ID, Data Cnt) is the same as that shown in FIG. 3. The index information Data* represents conditions for extracting the unique part of the notification data and for editing (format converting).

Figure 7:
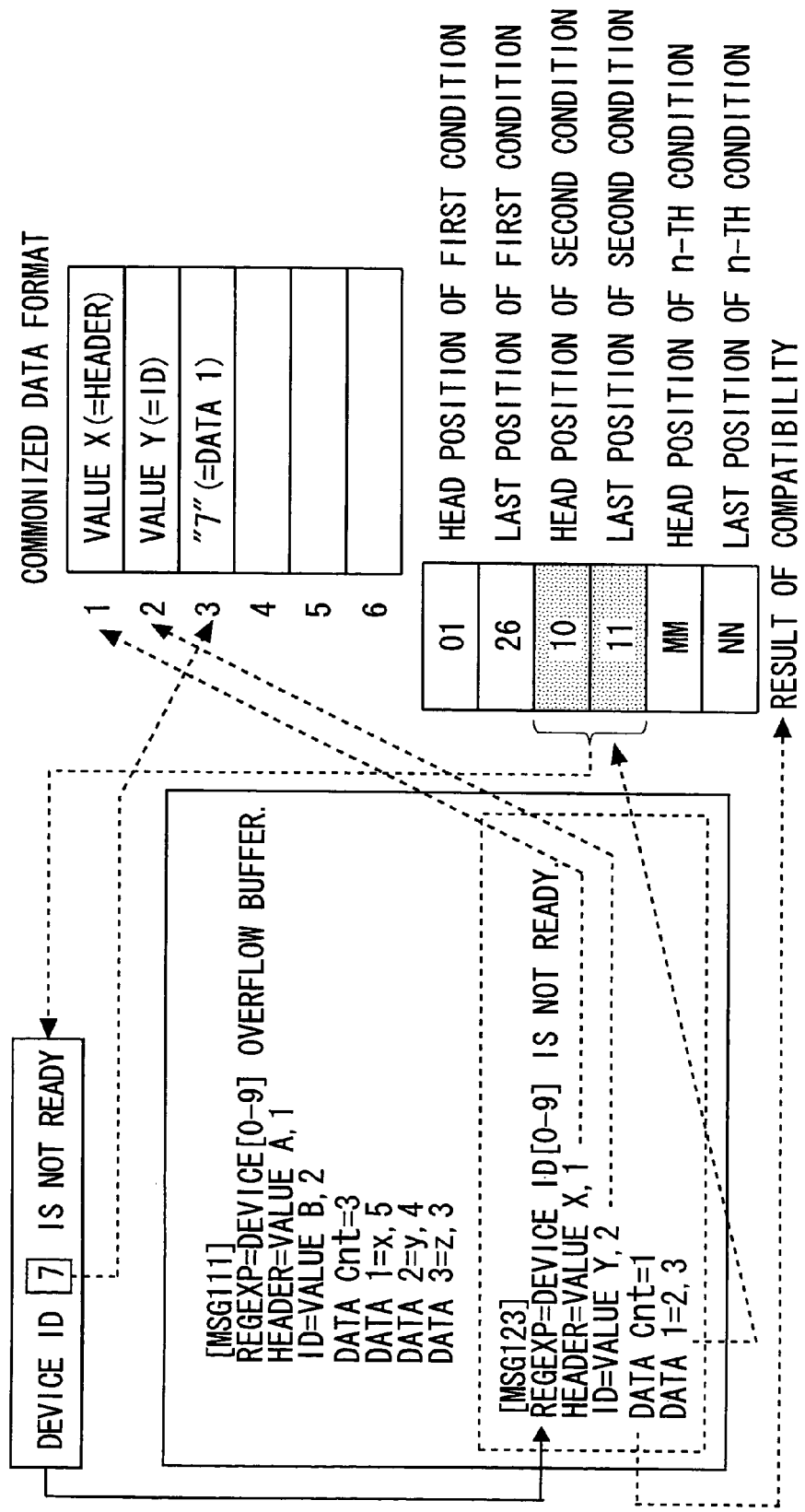
FIG. 7 is a diagram showing another example of the process of converting the notification data into the commonized data format.

If the notification data is [Device id 7 is not ready.] in the same as the previous case is, the fitting result acquired by the regular expression process is that, for example, as shown in FIG. 7, a head position (a head character position) of a first condition (a total character count) is [01], a last position (a last character position) of the first condition is [26], the head position of a second condition (a unique part) is [10], the last position of the second condition is [11], the head position of an n-th condition is [MM], and the last position of the n-th condition is [NN]. On the other hand, the index information is Data 1=2, 3, and designates that "the sequential order [2] of the fitting result representing the unique part is stored in the storage position [3] in the commonized data format".

Then, the 0th-order filter processing unit 10 edits, based on the designation of the index information, the notification data into the data in the commonized data format. To be specific, in the case shown in FIG. 7, the Header value "value X" is stored in the first storage position in the commonized data format, the ID value "value Y" is stored in the second storage position in the commonized data format, and further the character [7] on the notification data, which is specified by the head position [10] and the last position [11] (the second fitting result) of the second condition, is stored in the third storage position in the commonized data format. Through this process, the notification data are converted into the data (value X, value Y, "7", . . . ) in the commonized data format in the same way as in the aforementioned case.

Figure 8:
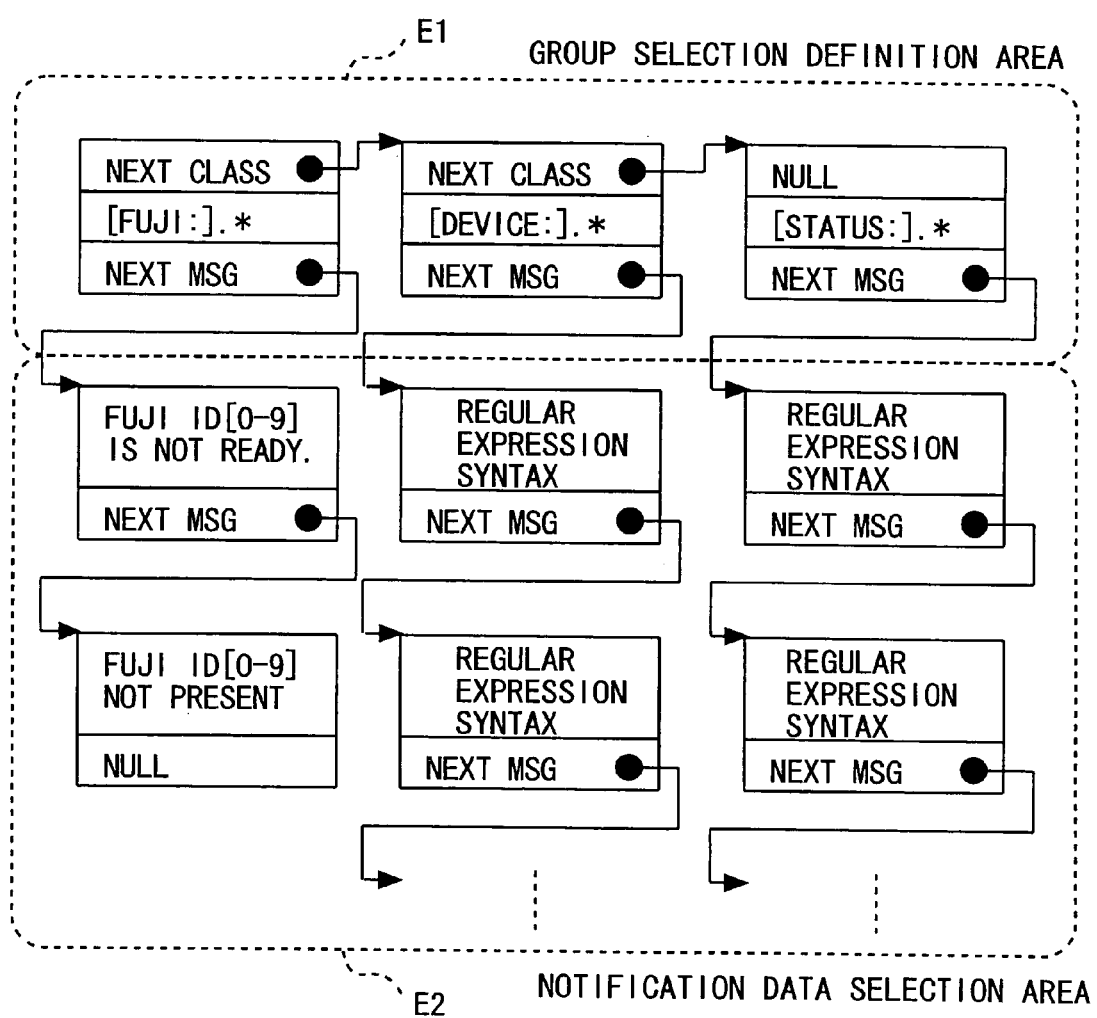
FIG. 8 is a diagram showing the regular expression syntax associated with each other, defined in the setting file used by the 0th-order process.

For enabling efficient selection of the regular expression syntax compatible with the notification data in the regular expression process (the process in S2 in FIG. 2), the plurality of regular expression syntaxes can be defined in the setting file in a way that divides these syntaxes on a group-by-group basis. In this case, as shown in FIG. 8, the setting file has a group selection definition area E1 and a notification data selection area E2.

Defined in the group selection definition area E1 are, for instance, group identifiers ([Fuji:] [Device], [Status]) for specifying types of the components (the hardware, the software, functions of devices, makers of the devices, etc.) within the managed system 100. The group identifier is determined based on the data part that can be contained in the notification data.

The group identifiers defined in the group selection definition area E1 are associated with each other by chain information (NextClass). If the chain information is NULL, this represents that there is no group identifier with which the corresponding group identifier is associated. The plurality of regular expression syntaxes are defined in the notification data selection area E2. Each group identifier (e.g., [Fuji:].) in the group selection definition area E1 is associated by the chain information (NextMsg) with the regular expression syntax (e.g., Fuji id [0-9] is not ready.) containing the group identifier, which is defined in the notification data selection area E2. Further, the regular expression syntax starting with the same group identifier in the notification data selection area E2 is associated by the chain information (NextMsg). The plurality of regular expression syntaxes are thus associated by the chain information, whereby the plurality of regular expression syntaxes are grouped on the group-identifier-by-group-identifier basis.

Figure 9:
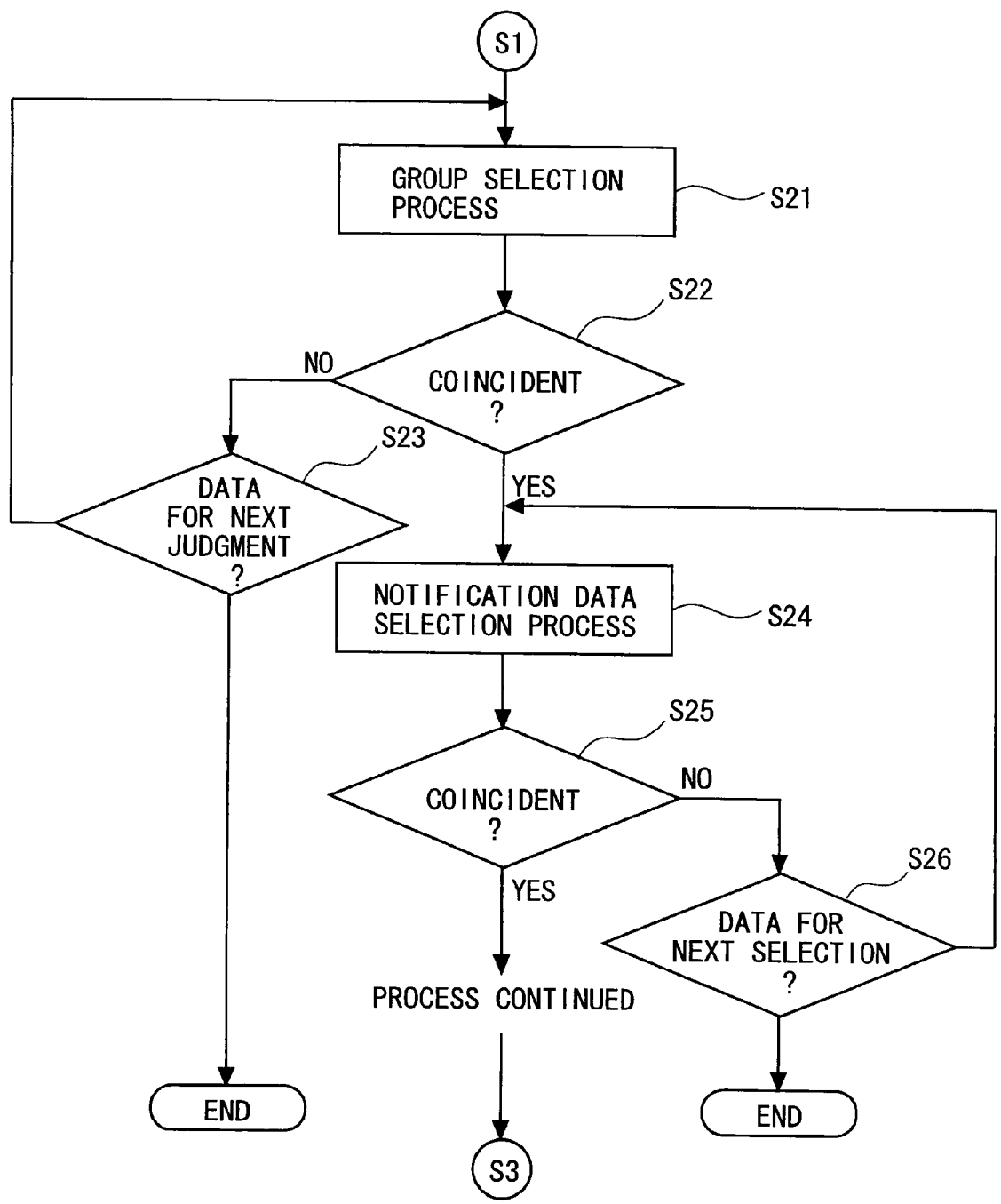
FIG. 9 is a flowchart showing a process in the 0th-order filter processing unit for determining the regular expression syntax corresponding to the notification data by use of the regular expression syntaxes associated as shown in FIG. 8.

Thus, the 0th-order filter processing unit 10 executes the regular expression process (refer to S2 in FIG. 4) according to a procedure shown in, e.g., FIG. 9 by use of the setting file in which the plurality of regular expression syntaxes managed by grouping are defined.

In FIG. 9, the 0th-order filter processing unit 10 executes a group selection process (S21). In this group selection process, one group identifier is selected from the plurality of group identifiers defined in the group selection definition area E1, and the selected group identifier is compared with the acquired notification data (refer to S1 in FIG. 4). Then, the 0th-order filter processing unit 10 judges whether or not the selected group identifier is coincident with part (e.g., the head part) of the notification data (S22). Namely, the 0th-order filter processing unit 10 judges whether or not the selected group identifier is contained in the notification data. Then, if the selected group identifier is not contained in the notification data (NO in S22), the 0th-order filter processing unit 10 judges based on the chain information of the selected group identifier whether there is a next group identifier (judgment Data) or not (S23). Namely, it is judged whether the chain information of the selected group identifier is NULL or not.

When judging that the next group identifier exists (YES in S23), the 0th-order filter processing unit 10 executes again the group selection process (S21), and judges whether or not the group identifier specified by the chain information is coincident with part of the acquired notification data (S22). In the course of repeating these processes (S21, S22, S23), if the specified group identifier is coincident with part of the acquired notification data (YES in S22), the 0th-order filter processing unit 10 executes the notification data selection process (S24). Note that if there is no next group identifier coincident with part of the acquired notification data (i.e., if there is no next group identifier contained in the acquired notification data) (NO in S23), the 0th-order filter processing unit 10 terminates the regular expression process.

In the notification data selection process, the regular expression syntax defined in the notification data selection area E2, which is specified by the chain information of the group identifier coincident with the head part of the notification data, is selected and then compared with the notification data. Then, the 0th-order filter processing unit 10 judges whether or not the selected regular expression syntax is coincident with the notification data (S25). If not coincident with each other (NO in S25), the 0th-order filter processing unit 10 judges based on the chain information of the selected regular expression syntax whether there is a next regular expression syntax (selection Data) or not (S26). Namely, it is judged whether the chain information of the selected regular expression syntax is NULL or not.

When judging that the next regular expression syntax exists (YES in S26), the 0th-order filter processing unit 10 executes again the notification data selection process (S24), and judges whether or not the acquired notification data is coincident with the regular expression syntax specified by the chain information (S25). In the course of repeating these processes (S24, S25, S26), if the acquired notification data is coincident with the specified regular expression syntax (YES in S25), the 0th-order filter processing unit 10 executes the processes from step S3 onward in FIG. 4. With this operation, the acquired notification data are converted into the commonized data format. Note that if there is no next regular expression syntax coincident with the acquired notification data (NO in S26), the 0th-order filter processing unit 10 finishes the regular expression process.

Thus, the regular expression syntax coincident with the notification data is selected from the plurality of regular expression syntaxes divided into the groups, and hence the regular expression syntax coincident with the notification data can be efficiently specified. Consequently, the regular expression process can be efficiently executed.

There is a case, wherein the notification data about a single event are provided separately a plural number of times from the components (the hardware 20, the firmware 30 and the software 40) of the managed system 100. Note that the notification data positioned at the head of plural pieces of notification data representing the single event will hereinafter be termed head notification data, and the notification data subsequent to the head notification data is called continuous notification data. The setting file of the 0th-order filter processing unit 10 can be structured as shown in, e.g., FIG. 10 in order to give flexibility to a case that there are provided the head notification data and a single piece or plural pieces of continuous notification data with respect to the single event. Note that the example shown in FIG. 10 is based on such an assumption that the notification data given from one type of component (such as the hardware, the software, etc for providing the notification data belonging to the group identifier [Fuji:]) can be provided in a state where the notification data is divided into plural segment.

Figure 10:
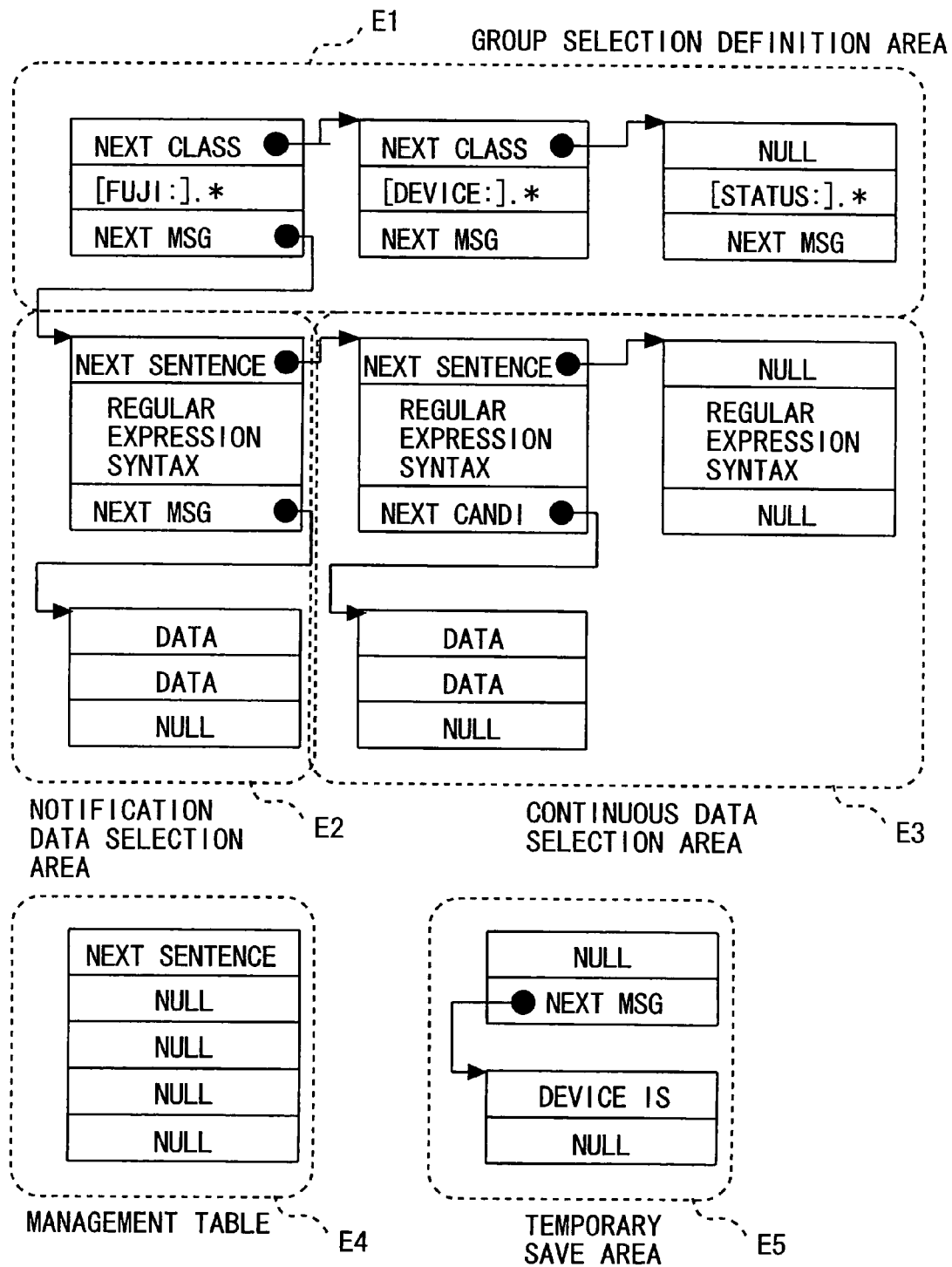
FIG. 10 is a diagram showing the regular expression syntaxes associated with each other, defined in the setting file when plural pieces of notification data are provided in division.

In FIG. 10, the setting file has, similarly to the example which is explained previously (see FIG. 8), the group selection definition area E1 containing the definitions of the group identifiers, and the notification data selection area E2 containing the definitions of the plurality of regular expression syntaxes associated by the chain information with the respective group identifiers. The setting file further includes a continuous data selection area E3, a management table E4 and a temporary save area E5.

The continuous data selection area E3 contains the definition(s) of the regular expression syntax(es) associated with a single piece or plural pieces of continuous notification data. In the plurality of regular expression syntaxes defined in the notification data selection area E2, the regular expression syntax corresponding to the head notification data is associated by the chain information (Next Sentence) with the regular expression syntax corresponding to the continuous notification data subsequent to the head notification data in the continuous data selection area E3. Further, if there exists other continuous notification data subsequent to the continuous notification data, the regular expression syntax corresponding to the continuous notification data is associated by the chain information (Next Sentence) with the regular expression syntax corresponding to the other continuous notification data. If the chain information is NULL, this represents that there is no existence of other continuous notification data (regular expression syntax) with which the continuous notification data (the regular expression syntax) is associated. If there exist the plurality of regular expression syntaxes associated with the regular expression syntax of the head notification data (or the continuous notification data) as a candidate regular expression syntax which is substituted for the head notification data (or the continuous notification data), the plurality of candidate regular expression syntaxes are associated by the chain information (NEXT MSG, or Next Candi).

The management table E4, if the acquired notification data is the head notification data having the continuous notification data (or the continuous notification data further having the continuous notification data), is employed for storing the chain information (Next Sentence) indicating where the regular expression syntax corresponding to the head notification data or the continuous notification data is associated with. Moreover, the temporary save area E5 is an area used for temporarily storing the already-extracted head notification data and continuous notification data. The head notification data and the continuous notification data stored in the temporary save area E5 are associated by the chain information (Next Msg).

Figure 11:
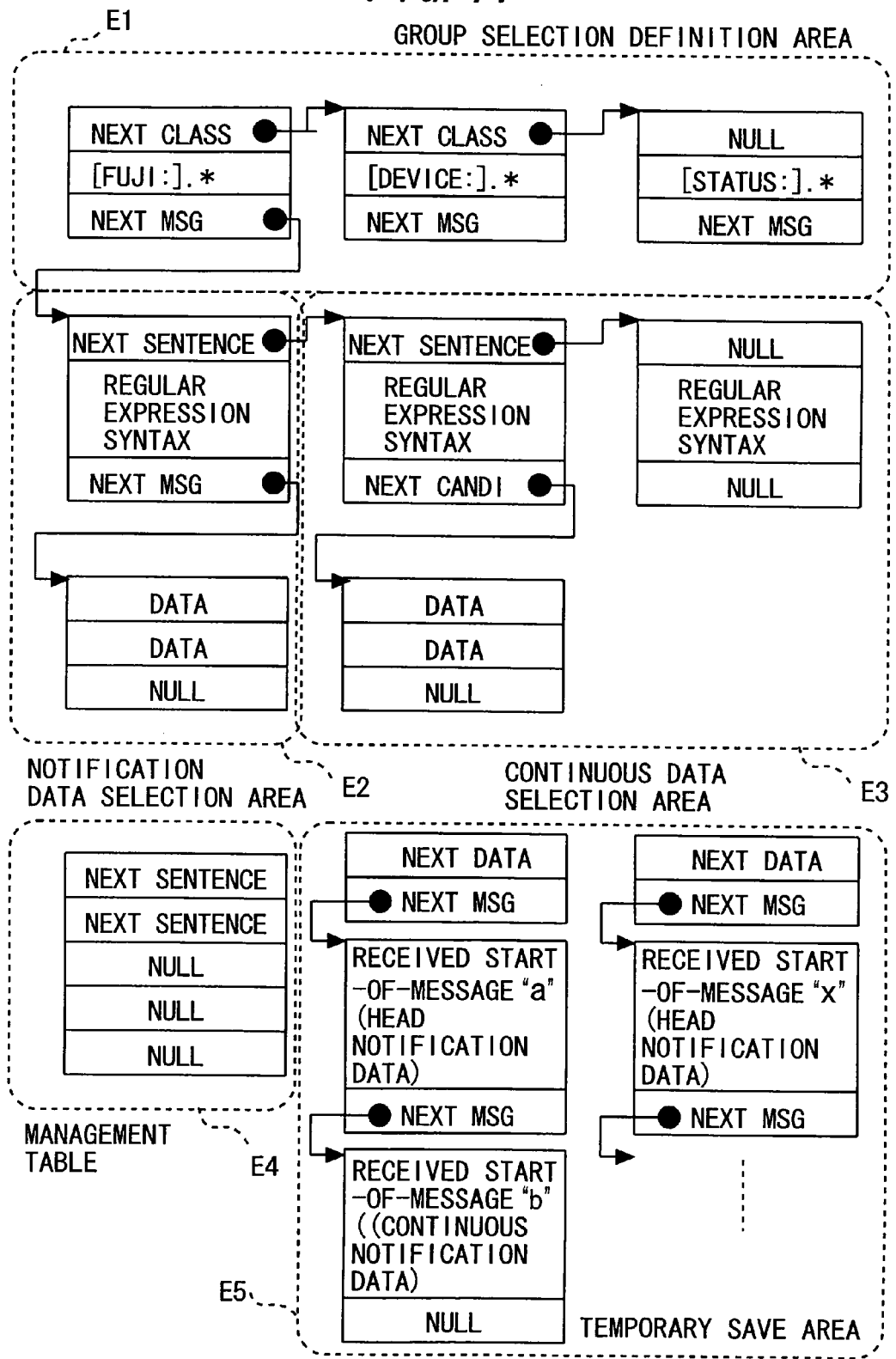
FIG. 11 is a diagram showing another example of the regular expression syntaxes associated with each other, defined in the setting file when plural pieces of notification data are provided in division.

The example (see FIG. 10) is based on such an assumption that the notification data given from one type of component can be provided in a way of being divided, however, if the notification data given from plural types of components can be provided in a way of being divided, the setting file of the 0th-order filter processing unit 10 can be structured as shown in FIG. 11.

In FIG. 11, the structures of the group selection definition area E1, the notification data selection area E2 and the continuous data selection area E3 are the same as in the case shown in FIG. 10. The management table E4 is so structured as to be capable of storing the chain information (Next Sentence) indicating where the regular expression syntaxes corresponding to plural types of head notification data (or the continuous notification data further having the continuous notification data) from plural types of component are respectively associated with. Moreover, the temporary save area E5 is so structured as to be capable of temporarily storing the plural types of head notification data and continuous notification data. Then, the same type of head notification data and continuous notification data are, similarly to the case shown in FIG.10 , associated by the chain information (Next Msg), and the different type of head notification data from plural types of component is associated by the chain information (Next Data).

As described above, if the notification data given from the components of the managed system 100 can be provided in a way of being divided, this regular expression process involves using the data corresponding to the index information (RegExp, Header, ID, Data Cnt, Data*) defined as shown in FIGS. 12 and 13 (specific examples). In this case, the index information RegExp represents the regular expression syntax corresponding to the head notification data and the identifier of the continuous notification data subsequent thereto. Note that if there exist plural pieces of continuous notification data with respect to the head notification data, the index information RegExp represents the identifiers of the plural pieces of continuous notification data.

Figure 14:
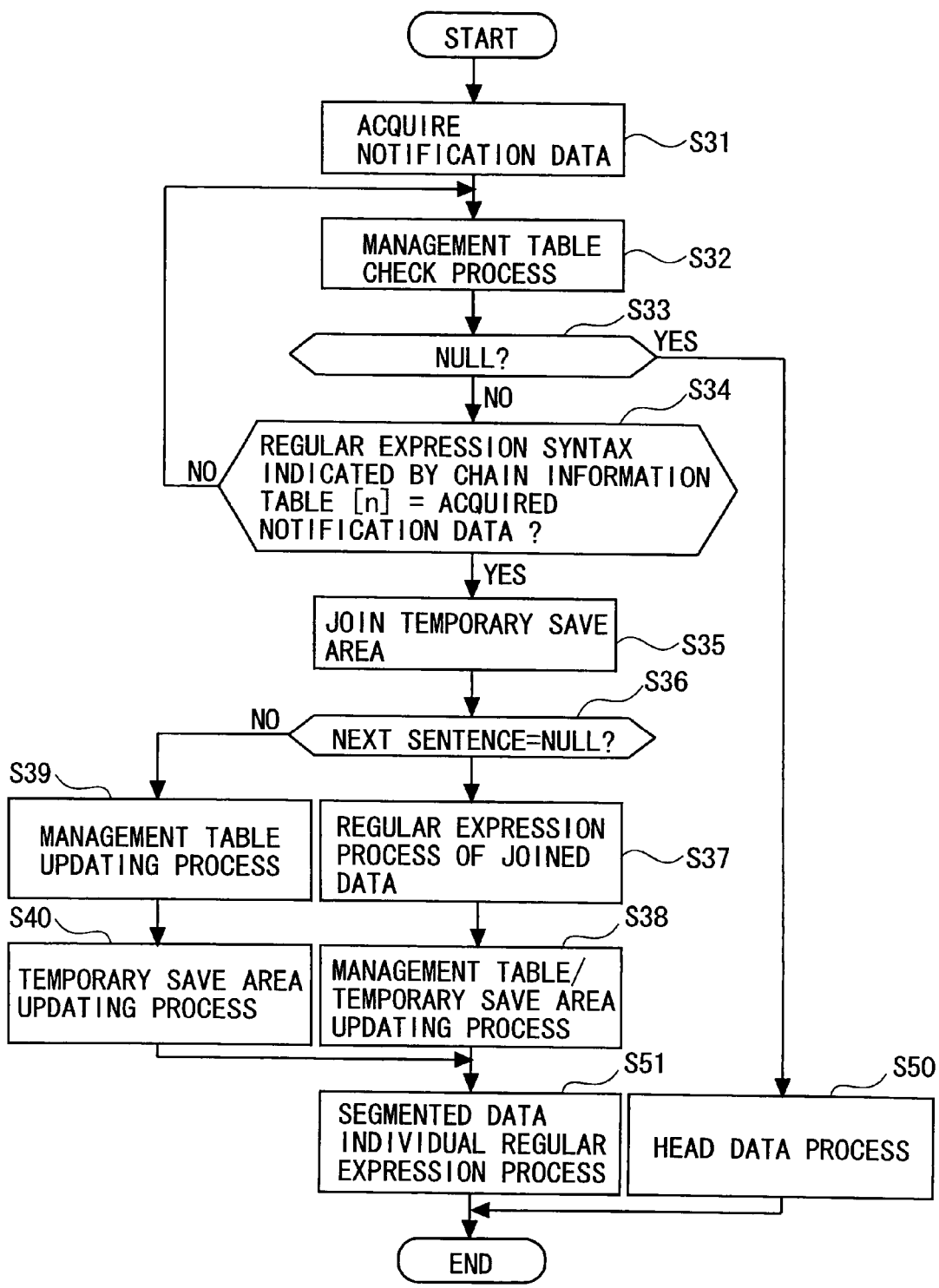
FIG. 14 is a flowchart (part 1) showing a procedure of the processes executed in the 0th-order filter processing unit when plural pieces of notification data are provided in division.

The 0th-order filter processing unit 10 executes processes in accordance with a procedure shown in FIG. 14.

In FIG. 14, the 0th-order filter processing unit 10, when acquiring the notification data (S31), checks the management table E4 (see FIGS. 10 and 11) (S32), and judges whether or not the chain information (Next Sentence) is set in the management table E4 (S33). If the chain information (Next Sentence) is not set in the management table E4 (if NULL is set) (YES in S33), the 0th-order filter processing unit 10 executes a head data process shown in FIG. 15. Namely, if the first notification data (the head notification data) that can be provided in division is not yet actually provided (YES in S33), the head data process (S50) shown in FIG. 15 is executed.

In FIG. 15, similarly to the example (see FIG. 9), a group selection process S51 is executed, and it is judged by referring to the group selection definition area E1 (see FIGS. 10 and 11) of the setting file whether or not the group identifier selected from the plurality of group identifiers defined in the group selection definition area E1 is coincident with the notification data (S52, S53). When the head part of the notification data is coincident with the group identifier (YES in S52), similarly to the example which is already explained (see FIG. 9), a notification data selection process S54 is executed, and there is made, by referring to the notification data selection area E2 of the setting file, judgment about coincidence with the regular expression syntax defined in the notification data selection area E2, which is specified by the chain information from the group identifier coincident with the head part of the notification data (S55, S56).

If the regular expression syntax coincident with the notification data exists (YES in S55), the 0th-order filter processing unit 10 judges whether or not this regular expression syntax is associated by the chain information (Next Sentence) with the regular expression syntax corresponding to the continuous notification data defined in the continuous data selection area E3 (see FIGS. 10 and 11) (S57). Namely, it is judged whether the chain information of the regular expression syntax coincident with the notification data that is defined in the notification selection area E2, is NULL or not.

If the regular expression syntax coincident with the notification data is not associated with the regular expression syntax corresponding to the continuous notification data (the chain information=NULL) ("=NULL" in S57), the 0th-order filter processing unit 10 infers that the acquired notification data is not the head notification data provided in division, and executes the processes from step S3 onward in FIG. 4 with respect to the regular expression syntax coincident with that notification data. Through these processes, the acquired notification data can be converted into the commonized data format.

Whereas if the regular expression syntax coincident with the notification data is associated with the regular expression syntax corresponding to the continuous notification data (the chain informati≠NULL) ("≠NULL" in S57), the 0th-order filter processing unit 10 infers that the notification data is the head notification data provided in division, then sets the chain information thereof in the management table E4 (S58), and stores the acquired notification data (the head notification data) in the temporary save area E5 (S59) (see FIGS. 10 and 11).

Referring back to FIG. 14, if the chain information (Next Sentence) is set in the management table E4 (NO in S33), the 0th-order filter processing unit 10 infers that the head notification data or the continuous notification data has already been acquired, and judges whether or not the regular expression syntax specified by the chain information (Next Sentence) defined in the continuous data selection area E3 corresponds(is compatible with) the acquired notification data (S34). If judged not to be compatible with each other (NO in S34), the 0th-order filter processing unit 10 judges by checking again the management table E4 (S32) whether or not there is the next chain information to be set in the management table E4 (S33). Then, the 0th-order filter processing unit 10, in the same way as the aforementioned, if there is no next chain information (YES in S33), executes the head data process (S50) shown in FIG. 15. In this case, when judging in the process (S57) in FIG. 15 that there is the chain information to the continuous notification data, it follows that a new piece of chain information (Next Sentence) other than the data already set in the management table E4 is to be set in the management table E4. Namely, it follows that the new type of notification data divided into the plurality of data segments was received. Further, if the next chain information exists (NO in S33), the 0th-order filter processing unit 10 judges whether or not the regular expression syntax corresponding to the continuous notification data specified by that chain information corresponds (is compatible with) the notification data (S34).

In the course of repeating the processes (S32, S33, S34), it is judged that the regular expression syntax corresponding to the continuous notification data specified by the chain information (which is a value of a component table [n] of the management table E4) corresponds to (is compatible with) the acquired notification data (YES in S34), the 0th-order filter processing unit 10 judges that the acquired notification data is the continuous notification data. Then, the notification data (the continuous notification data) is joined to respective pieces of notification data containing the head notification data, which have been stored in the temporary save area E5 at that point of time (S35). That is, a series of notification data are generated.

Note that if plural types of head notification data are stored in the temporary save area E5, a position (Next Data in the position corresponding to Next Sentence in FIG. 11) in the temporary save area E5 associated with the table [n] as a component of the management table E4, is referred to. In this case, there may also be retained a pointer pointing the head (the position of each Next Data) of a list in the temporary save area from each component (tables [n]) of the management table E4.

Then, the 0th-order filter processing unit 10 judges whether or not the regular expression syntax corresponding to the acquired notification data (the continuous notification data) defined in the continuous data selection area E3 is associated by the chain information (Next Sentence) with the regular expression syntax corresponding to other continuous notification data (S36).

If the regular expression syntax corresponding to the notification data (the continuous notification data) acquired this time is associated with the regular expression syntax corresponding to other continuous notification data (No in S36), the 0th-order filter processing unit 10 infers that all the divided notification data are not yet acquired, and sets, in the management table E4, the chain information (refer to the process in S34) of the regular expression syntax corresponding to the notification data (the continuous notification data) acquired this time. In this case, the chain information to the regular expression syntax corresponding to the other continuous notification data is overwritten to the component (the table [n] used for the judgment in S34) having the setting of "Next Sentence" already set in the management table E4. Namely, the table [n] as the component of the management table E4 used for the judgment in S34 is overwritten (with the chain information). Moreover, the notification data acquired this time is stored in an associated status with a series of other notification data in the temporary save area E5 (S40) (see FIGS. 10 and 11).

On the other hand, if the regular expression syntax corresponding to the notification data (the continuous notification data) acquired this time is not associated with the regular expression syntax corresponding to the other continuous notification data (the chain information=NULL) (YES in FIG. 36), i.e., if all the divided notification data are acquired, the 0th-order filter processing unit 10 executes the regular expression process with respect to the series of notification data acquired by joining (S37). Specifically, the processes in steps S2, S3, S4 shown in FIG. 4 are executed, the regular expression syntax corresponding to the joined notification data is selected, the unique part of the series of notification data is extracted (see FIGS. 12 and 13), and the series of notification data are converted based on a result of those processes into the data in the commonized data format.

Thereafter, the 0th-order filter processing unit 10 executes an updating process of the management table E4 and the temporary save area E5 (S38, S39). To be specific, the chain information about the already-processed notification data is deleted from the management table E4, and the already-processed notification data are deleted from the temporary save area E5.

After the process in S38 or S40, the 0th-order filter processing unit 10 executes an individual process upon the divided data (S51). Specifically, the processes in steps S2, S3, S4 shown in FIG. 4 are executed, the regular expression syntax corresponding to the divided individual notification data is selected, the unique part of the series of notification data is extracted (see FIGS. 12 and 13), and the individual notification data is converted based on a result of those processes into the data in the commonized data format. With this process, it follows that the divided notification data is processed individually by the regular expression.

As described above, the regular expression syntaxes corresponding respectively to the head notification data and the single piece or plural pieces of continuous notification data, which structure the notification data representing the single event, are managed in association (see FIGS. 10 and 11), and the processes are conducted in accordance with the procedures shown in FIGS. 14 and 15, whereby even when the plural pieces of notification data representing the single event are provided in division from the components within the managed system 100, it follows that the regular expression process is effected for the series of notification data into which the plural pieces of notification data are joined. As a result, the series of notification data representing the single event are converted into the data in the commonized data format.

As described above, based on the notification data converted in the predetermined format (the commonized data format) by the 0th-order filter processing unit 10, the first-order filter processing unit 11 and the second-order filter processing unit 12 control notifying the administrator terminal 200 of the event obtained from the notification data.

Management information as shown in FIG. 16 is predefined in the event notification management program 110. To be more specific, [type (common)], [notification processing means (first-order process)], [notification processing means (second-order process)], [occurrence count upper limit value (second-order process)], [monitoring time (interval) (second-order process)], [restraining time (second-order process)], [occurrence count (second-order process)], [notification effectuation time (second-order process)] and [occurrence time (second-order process)] are defined as the management information.

[Type (common)] is information common to the first-order filter processing unit 11 and the second-order filter processing unit 12, and represents information for identifying the event (abnormality etc.) acquired from the notification data. [Notification processing means (first-order process)] is information used by the first-order filter processing unit 11, and indicates the notification processing means such as the SNMP Trap (message), the e-mail, the second-order process (the second-order filter processing unit 12), etc. through which to notify of the information about the event. Thus, the [notification processing means (first-order process)] used in the first-order filter process 11 might indicate the second-order filter process 12 as the case may be.

[Notification processing means (second-order process)] is information used by the second-order filter processing unit 12 and represents the notification processing means such as the SNMP Trap, the e-mail, etc. through which to notify of the information about the event. [Occurrence count upper limit value(second-order process)] is information used by the second-order filter processing unit 12 and represents an upper limit value of the number of events occurred. [Monitoring time (second-order process)] is information used by the second-order filter processing unit 12 and represents a period of time (interval) for monitoring the event occurred. [Restraining time (second-order process)] is information used by the second-order filter processing unit 12 and is employed as a judgment criterion for restraining the notification if a designated period of time (the restraining time) does not elapse since the time when notified last time. [Occurrence count (second-order process)], [notification effectuation time (second-order process)] and [occurrence time (second-order process)] are the information used by the second-order filter processing unit 12, and represent the number of occurrences of the event, the time when the event notification is effectuated, and the time when the event occurred, respectively.

Figure 17:
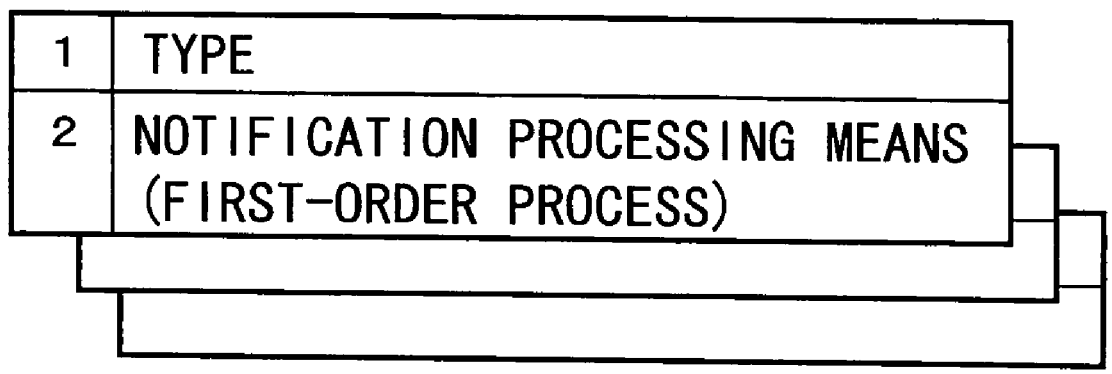
FIG. 17 is a diagram showing a management information table used by the first-order filter processing unit.
Figure 18:
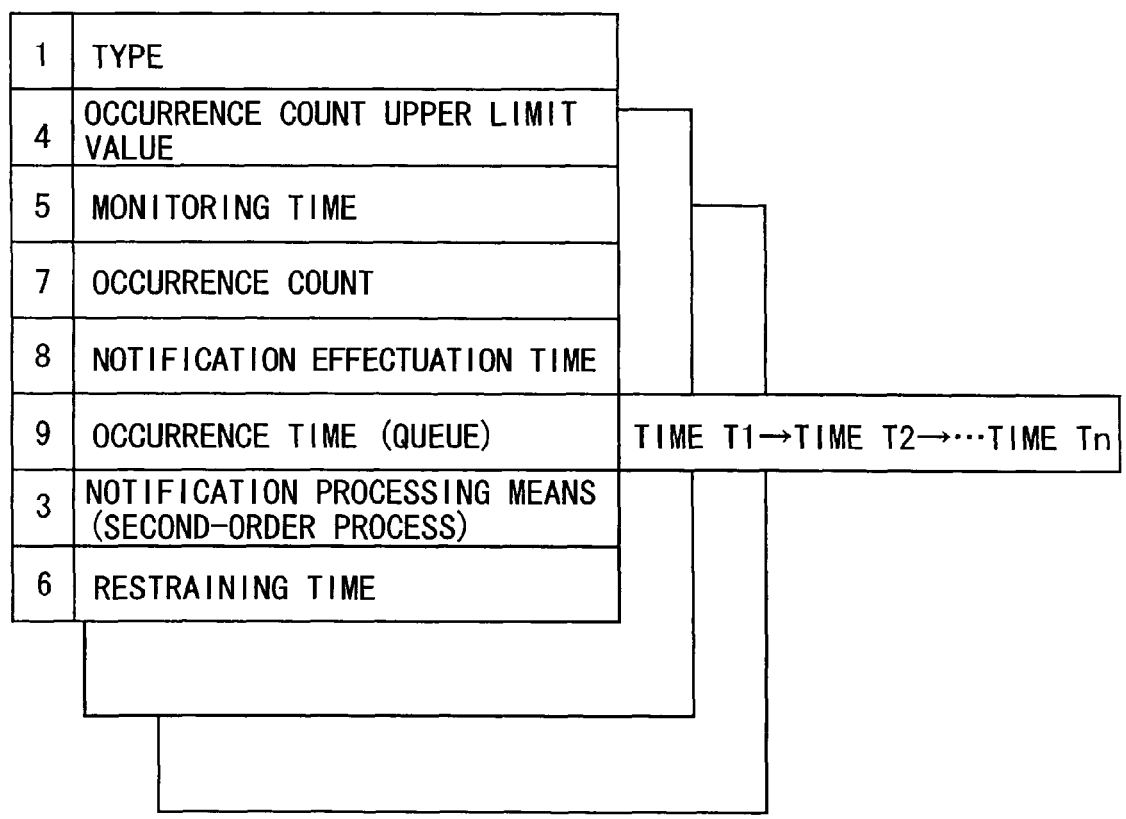
FIG. 18 is a diagram showing the management information table used by the second-order filter processing unit.

The first-order filter processing unit 11 has a management information table in which, as shown in FIG. 17, each [type] defined as described above is associated with the[notification processing means (first-order process)] as a content of the notification process. Further, the second-order filter processing unit 12 has an management information table in which, as shown in FIG. 18, each [type] defined as described above is associated with the [occurrence count upper limit value], the [monitoring time], the [occurrence count], the [notification effectuation time], the [occurrence time], the [notification processing means (second-order process)] and the [restraining time]. In the information management table shown in FIG. 18, the [occurrence count upper limit value], the [monitoring time], the [restraining time] and the [notification processing means (second-order process)] represent the contents of the notification processes by the second-order filter processing unit 12, and among these values the [occurrence count upper limit value], the [monitoring time] and the [restraining time] represent notification conditions.

In the management information table (see FIG. 17) held by the first-order filter processing unit 11, the notification processing means (the e-mail etc.) other than the second-order process (the second-order filter processing unit 12) can be set in the [notification processing means (first-order process)] associated with the [type] that specifies an event exhibiting comparatively high urgency, and the second-order process (the second-order filter processing unit 12) can be set in the [notification processing means (first-order process) associated with the [type] that specifies an event exhibiting comparatively low urgency.

Moreover, in the management information table (see FIG. 18) held by the second-order filter processing unit 11, a comparatively small value can be set in the [occurrence count upper limit value] associated with the [type] that specifies the event exhibiting the comparatively high urgency, a comparatively short time can be set in the [monitoring time] associated with this [type], and further a comparatively long time can be set in the [restraining time] associated with this [type].

Figure 19:
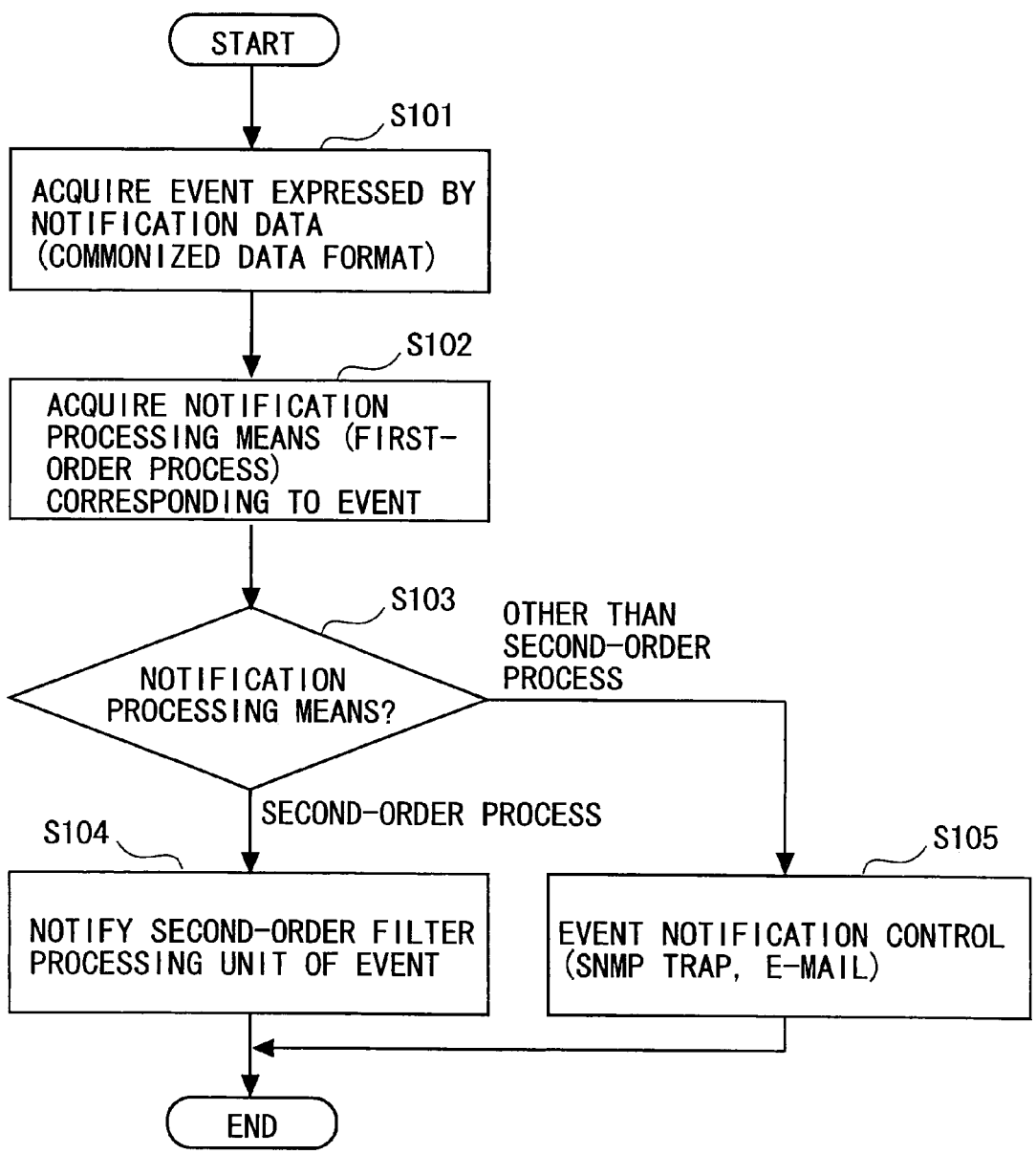
FIG. 19 is a flowchart showing a processing procedure in the first-order filter processing unit.

The first-order filter processing unit 11 executes processes in accordance with a procedure shown in FIG. 19.

In FIG. 19, the first-order filter processing unit 11 acquires the event occurred within the managed system 100 that is expressed by the notification data (the commonized data format) provided from the 0-th order filter processing unit 10 (SlOl). Specifically, the event corresponding to the notification data is acquired in a way that refers to an association table between the contents of the notification data and the events.

Subsequently, the first-order filter processing unit 11 refers to the management information table (see FIG. 17) and thus acquires the [notification processing means (first-order process)] associated with the [type] that specifies the event (S102). It is judged whether or not this acquired [notification processing means (first-order process)] is the second-order process (the second-order filter processing unit 12)] (S103). If the acquired [notification processing means (first-order process)] is the second-order process, the first-order filter processing unit 11 notifies the second-order filter processing unit 12 of the event (S104). Whereas if the acquired [notification processing means (first-order process)] is a notification processing means other than the second-order process (the second-order filter processing unit 11), the first-order filter processing unit 11 refers to the management information table (see FIG. 17) and instructs the [notification processing means (first-order process)] (the notification processing unit 15) associated with the [type] specifying the event to notify the administrator terminal 200 of the event (SlO5). With this notification, the administrator terminal 200 can confirm the event occurred in the management system 100.

Figure 20:
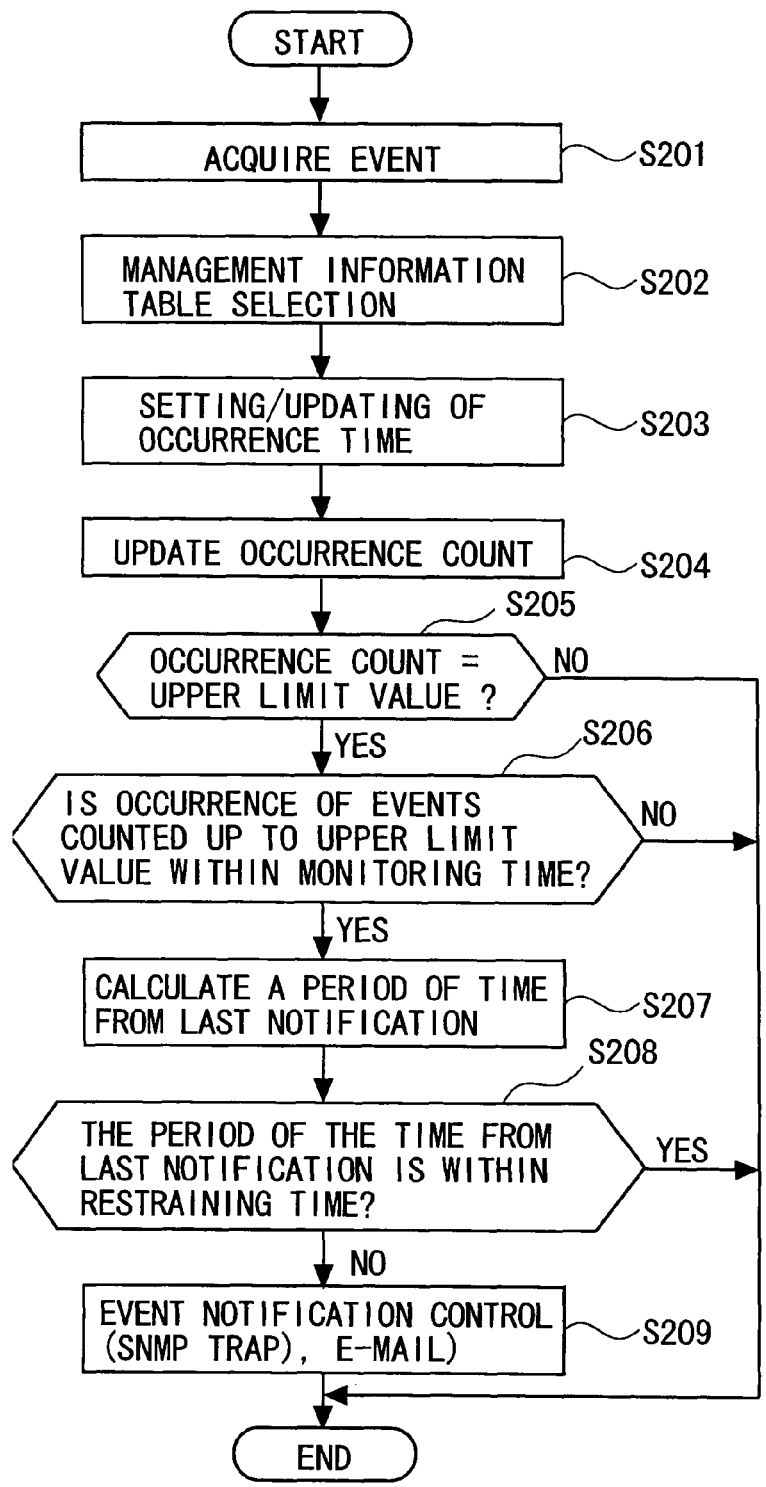
FIG. 20 is a flowchart showing a processing procedure in the second-order filter processing unit.

The second-order filter processing unit 12 receiving the event notification from the first-order filter processing unit 11 executes processes in accordance with a procedure shown in FIG. 20.

In FIG. 20, the second-order filter processing unit 12, upon acquiring the event (S201), selects the management information table (see FIG. 18) about the [type] corresponding to the acquired event (S202). Then, the second-order filter processing unit 12 sets event acquisition time in the [occurrence time] in this management information table (S203), and increments the value set in this [occurrence count] by only 1 (+1) (S204). As a result, for example, the management information table in which, as shown in FIG. 21A, the [occurrence count] =0 and the [type] =A representing an initial status with no time setting in the [occurrence time], is updated into a status wherein, as shown in FIG. 21B, the [occurrence count] =1 and the time (e.g., 7:30) is set in the [occurrence time]. Note that the presetting in this management information table is such that the[occurrence count upper limit value] =3, the [monitoring time] =60 min, the [notification effectuation time ] =0 (representing an initial value: non-effectuated notification), the [notification processing means] =the e-mail (the notification processing unit 15), the [restraining time] =60 min (and so forth).

Subsequently, the second-order filter processing unit 12 judges whether or not the set [occurrence count] reaches the [occurrence count upper limit value ] (=3) (S205). In the case of the example shown in FIG. 21B, the [occurrence count ] (=1) does not reach the [occurrence count upper limit value] (=3) (NO in S205), and hence the second-order filter process 12 terminates a series of processes.

For instance, the management information table in which, as shown in FIG. 22A, the [occurrence count] =2, and the time "7:30" and the time "7:31" are set in the [occurrence time], is updated as a result of acquiring the event (refer to S201) into a status in which, as shown in FIG. 22B, the [occurrence count] =3, and the event acquisition time (e.g., the time "7:45") is set in the [occurrence time], whereby it is judged that the [occurrence count] (=3) reaches the [occurrence count upper limit value] (=3) (YES in S205). In this case, the second-order filter processing unit 12 further judges whether or not the event reaching the [occurrence count upper limit value] (the number of times) occurred within the monitoring time (60 min) (S206).

In the case shown in FIG. 22B, the first event occurrence time is 7:30, and the event occurrence time of this time (third time) is 7:45, thereby judging that the event reaching the [occurrence count upper limit value] (=3) occurred within the monitoring time (60 min) (YES in S206). Hereupon, the second-order filter processing unit 12 calculates a period of time from the [notification effectuation time] of the last time to the event acquisition time of this time (S207), and judges whether or not the time from the [notification effectuation time] of the last time is within the restraining time (60 min) (S208). In this case, the [notification effectuation time] of the last time (see FIG. 22A) takes the initial value (=0), and therefore the second-order filter processing unit 12 infers that the time from the [notification effectuation time] of the last time exceeds the restraining time (NO in S208), and controls the event notification (S209). Namely, the administrator terminal 200 is given the notification that the event specified by the [type] =A described in the management information table occurred within the managed system 100 by the e-mail (the notification processing unit 15) set in the [notification processing means] in the management information table.

After finishing the event notification control, the second-order filter processing unit 12 sets, e.g., the event notification time (e.g., 7:45) in the [notification effectuation time] of the management information table (see FIG. 22B).

Thus, in the management information updated status (see FIG. 23A (the same as FIG. 22B), when further acquiring the event specified by the [type] =A (refer to S201), the second-order filter processing unit 12, as shown in FIG. 23B, updates the occurrence count such as the [occurrence count] =4 and sets the event acquisition time (the event occurrence time: e.g., the time "8:40") in the [occurrence time] (S202-S204). Note that three time values at the maximum can be set in the [occurrence time], in which case the first time "7:30" is deleted, and new occurrence time "8:40" is set. As a result, the management information table comes to such a status that the three time values such as the time "7:31", the time "7:45" and the time "8:40" are set in the [occurrence time].

In this status (see FIG. 23B, the second-order filter processing unit 12 judges that the event occurrence count reaches the [occurrence count upper limit value] (=3) (YES in S205). Further, a period between the first time "7:31" and the last time (the time set this time) "8:40", which are set in the [occurrence time], exceeds 60 min, and hence the second-order filter processing unit 12 judges that the event reaching the [occurrence count upper limit value] (the number of times) occurred over the monitoring time (60 min) (NO in S206). As a result, though the event occurrence count reaches the [occurrence count upper limit value] (=3), the second-order filter processing unit 12 judges that the event occurrence frequency is small, and finishes processing without giving the notification.

Further, in the thus-updated status of the management information table (FIG. 24A (the same as FIG. 23B), when further acquiring the event specified by the [type] =A (refer to S201), the second-order filter processing unit 12, as shown in FIG. 24B, updates the occurrence count such as the [occurrence count] =5 and sets the event acquisition time (e.g., "8:41") in the [occurrence time] (S202-S204). In this case also, the first time "7:31" set in the [occurrence time] is deleted, and new occurrence time "8:41" is set. As a result, the management information table comes to such a status that the three time values such as the time "7:45", the time "8:40" and the time "8:41" are set in the [occurrence time].

In this status (see FIG. 24B), the second-order filter processing unit 12 judges that the event occurrence count reaches the [occurrence count upper limit value] (=3) (YES in S205). Moreover, a period of time between the first time "7:45" and the last time (the time set this time) "8:41", which are set in the [occurrence time], does not reach the monitoring time "60 min" (YES in S206), and therefore the second-order filter processing unit 12 calculates a period of time (56 min) from the [notification effectuation time] (7:45) of the last time to the event acquisition time (8:41) of this time (S207), and judges that the period of time (56 min) from the [notification effectuation time] of the last time is within the restraining time (60 min) (YES in S208). As a result, though the [occurrence count upper limit value] (=3) having the setting of the event occurrence count was reached and the period of time till the [occurrence count upper limit value] (=3) is reached is within the monitoring time (60 min), the period of time till the [occurrence count upper limit value] (=3) is reached is within the restraining time (60 min), so that the second-order filter processing unit 12 terminates the processes without giving the notification.

According to the hierarchical processing by the first-order filter processing unit 11 and the second-order filter processing unit 12 as described above, with respect to the event exhibiting the high urgency, at a point of time when the notification data corresponding to this event is acquired, the administrator terminal 200 can be notified of the event through the process (see FIG. 19) by the first-order filter processing unit 11. Further, with respect to the event exhibiting the urgency that is not so high, as far as such a case that the event occurred a predetermined number of times (the occurrence count upper limit value) within the preset monitoring time (a comparatively high occurrence frequency case) is concerned, the administrator terminal 200 can be notified the event occurred within the managed system 100 through the process by the second-order filter processing unit 12. Moreover, even in a case wherein a certain event occurred the predetermined number of times within the monitoring time, if the event would occur the predetermined number of times within the preset restraining time, the administrator terminal 200 is not notified of the occurrence of this event.

Thus, the event notification can be controlled corresponding to the urgency of the event, and hence it is possible to prevent such a situation that the events having no necessity for the immediate notification increase with the result that a communication cost rises and that the administrator must check the notification originally having no necessity of being checked, and the efficient management of the system can be attained.

Note that in the event notification control (S209) in FIG. 20, if an event specified by a certain [type] occurs plural number of times, the administrator terminal 200 can be also notified of an event predicted from this occurred event as predictive information. In such a case, an event (fault) that might occur in the managed system 100 can be surely prevented.

In the example described above, the managed system 100 is the computer system such as the server etc. and may also be software or firmware. Moreover, the destination of the event notification is not limited to the computer system such as the administrator terminal 200 etc. and may also be software or firmware. In this case, the software or the firmware receiving the event notification can change a content of processing based on the event.

<<An storage medium readable by the machine>>A program, etc. for making the computer, other machine, device (which will hereinafter be referred to as the computer etc.) actualize any one of the functions can be stored on a storage medium readable by the machine etc. Then, the computer, etc. reads and executes the program on this storage medium, whereby the function can be provided.

Herein, storage medium readable by the computer etc. . . . connotes a storage medium capable of accumulating information such as data, programs, etc. electrically, magnetically, optically, mechanically or by chemical action, which can be read from the computer etc. . . . Among these recording mediums, for example, a flexible disc, a magneto-optic disc, a CD-ROM, a CD-R/W, a DVD, a DAT, an 8 mm tape, a memory card, etc. are given as those demountable from the computer etc. . . .

Further, a hard disc, a ROM (Read-Only Memory), etc. are given as the recording mediums fixed within the computer etc. . . .

<<Others>>

The disclosures of Japanese patent application No. JP2005-073612 filed on Mar. 15, 2005 including the specification, drawings and abstract are incorporated herein by reference.

What is claimed is:

1. A storage medium readable by a machine, tangible embodying a event notification management program of instructions executable by the machine to make the machine as a processing apparatus controlling notification to a predetermined system, of information about an event occurred within a system, the information being acquired from notification data provided from a component within the system, the processing apparatus comprising a format converting unit, a first processing unit and a second processing unit, the format converting unit including a file storing a plurality of regular expression syntaxes associated with a plurality of notification data, and having functions of:
selecting a head regular expression syntax corresponding to head notification data provided from the component, from the plurality of regular expression syntaxes stored in the file;
judging that the head notification data is one of a series of notification data that represent a single event occurred within the system and are provided separately a plural number of times from the component within the system upon occurrence of the single event if the selected head regular expression syntax is associated by chain information with a continuous regular expression syntax in the plurality of regular expression syntaxes stored in the file;
storing the head notification data in a temporary save area when judging that the head notification data is one of the series of notification data;
joining the head notification data stored in the temporary save area and continuous notification data provided from the component following the head notification data when the continuous regular expression syntax corresponds to the continuous notification data provided from the component;
generating the series of notification data by repeating the joining process; and
converting the series of notification data into a predetermined format based on a selecting process of selecting a regular expression syntax corresponding to the series of notification data and an extracting process of extracting unique part information of the series of notification data;

the first processing unit having functions of:
determining a content of a notification process corresponding to the event represented by the converted series of notification data on the basis of management information in which event identifying information specifying the event is associated with the content of the notification process;
notifying the second processing unit of the event when the determined content of the notification process indicates a second-order process; and
instructing a notification processing unit corresponding to the event to notify of information about the event when the determined content of the notification process does not indicate the second-order process; and the second processing unit having functions of:
retaining an occurrence situation including an occurrence count and an occurrence time regarding the event notified from the first processing unit when receiving the notified event; and
instructing a notification processing unit corresponding to the notified event to notify of information about the notified event if the retained occurrence situation regarding the notified event satisfies a notification condition corresponding to the notified event.

2. The storage medium readable by the machine, tangible embodying the event notification management program according to claim 1, wherein the notification condition includes an occurrence upper limit count of the same event within a predetermined period of time, and
- the second processing unit has a function of instructing, when the occurrence count of the same event reaches the occurrence upper limit count within the predetermined period of time, the notification processing unit corresponding to the notified event to notify of the information about the event.

3. The storage medium readable by the machine, tangible embodying the event notification management program according to claim 1, wherein the notification condition includes a notification restraining period, and
- the second processing unit has a function of restraining the notification processing unit from notifying of the information about the event notified from the first processing unit if a period of time since the reception of the last notified event is within the notification restraining period.

4. The storage medium readable by the machine, tangible embodying the event notification management program according to claim 1, wherein the plurality of regular expression syntaxes are grouped based on a part of information that can be included in the head regular expression syntax corresponding to the head notification data.

5. An event notification management apparatus controlling notification to a predetermined system, of information about an event occurred within a system, the information being acquired from notification data provided from a component within the system, comprising:
- a format converting unit;
- a storage unit storing management information in which event identifying information specifying the event is associated with a content of a notification process;
- a first processing unit; and
- a second processing unit, wherein
the format converting unit includes:
- a table unit storing and managing a plurality of regular expression syntaxes associated with a plurality of notification data;
- a syntax selection unit to select a head regular expression syntax corresponding to head notification data provided from the component, from the plurality of regular expression syntaxes stored in the table unit;
- a judging unit to judge that the head notification data is one of a series of notification data that represent a single event occurred within the system and are provided separately a plural number of times from the component within the system upon occurrence of the single event if the selected head regular expression syntax is associated by chain information with a continuous regular expression syntax in the plurality of regular expression syntaxes stored in the table unit;
- a storing unit to store the head notification data in a temporary save area when judging that the head notification data is one of the series of notification data;
- a joining unit to join the head notification data stored in the temporary save area and continuous notification data provided from the component following the head notification data when the continuous regular expression syntax corresponds to the continuous notification data provided from the component;
- a generating unit to generate the series of notification data by repeating the process of the joining unit; and
- a converting unit to convert the series of notification data into a predetermined format based on a selecting process of selecting a regular expression syntax corresponding to the series of notification data and an extracting process of extracting unique part information of the series of notification data;

the first processing unit includes:
- a first determining unit to determine the content of the notification process corresponding to the event represented by the converted series of notification data based on the management information in the storage unit;
- a first notifying unit to notify the second processing unit of the event when the determined content of the notification process indicates a second-order process; and
- a first instructing unit to instruct a notification processing unit corresponding to the event to notify of information about the event when the determined content of the notification process does not indicate the second-order process; and the second processing unit includes:
- a retaining unit to retain an occurrence situation including an occurrence count and an occurrence time regarding the event notified from the first processing unit when receiving the notified event; and
- a second instructing unit to instruct a notification processing unit corresponding to the notified event to notify of information about the notified event if the retained occurrence situation regarding the notified event satisfies a notification condition corresponding to the notified event.

6. An event notification management method controlling notification to a predetermined system, of information about an event occurred within a system that is acquired from notification data provided from a component within the system, the event notification management method executed by a processing apparatus including a storage unit storing a plurality of regular expression syntaxes associated with a plurality of notification data, a first processing unit and a second processing unit, comprising:
- selecting a head regular expression syntax corresponding to head notification data provided from the component, from the plurality of regular expression syntaxes stored in the storage unit;
- judging that the head notification data is one of a series of notification data that represent a single event occurred within the system and are provided separately a plural number of times from the component within the system upon occurrence of the single event if the selected head regular expression syntax is associated by chain information with a continuous regular expression syntax in the plurality of regular expression syntaxes stored in the storage unit;
- storing the head notification data in a temporary save area when judging that the head notification data is one of the series of notification data;
- joining the head notification data stored in the temporary save area and continuous notification data provided from the component following the head notification data when the continuous regular expression syntax corresponds to the continuous notification data provided from the component;
- generating the series of notification data by repeating the joining process;
- converting the series of notification data into a predetermined format based on a selecting process of selecting a regular expression syntax corresponding to the series of notification data and an extracting process of extracting unique part information of the series of notification data;

referring management information in which event identifying information specifying the event is associated with a content of a notification process;

determining the content of the notification process corresponding to the event represented by the converted series of notification data based on the referred management information at the first processing unit;

notifying the second processing unit of the event when the determined content of the notification process indicates a second-order process at the first processing unit; and instructing a notification processing unit corresponding to the event to notify of information about the event when the determined content of the notification process does not indicate the second-order process at the first processing unit; and retaining an occurrence situation including an occurrence count and an occurrence time regarding the event notified from the first processing step when receiving the notified event at the second processing unit; and instructing a notification processing unit corresponding to the notified event to notify of information about the notified event if the retained occurrence situation regarding the notified event satisfies a notification condition corresponding to the notified event at the second processing unit.

7. The storage medium readable by the machine, tangible embodying the event notification management program according to claim 1, wherein the generating function of the format converting unit generates the series of notification data by repeating the joining process till the continuous regular expression syntax is not associated by the chain information with another continuous regular expression syntax in the plurality of regular expression syntaxes stored in the file.

8. The event notification management apparatus according to claim 5, wherein the generating unit generates the series of notification data by repeating the process of the joining unit till the continuous regular expression syntax is not associated by the chain information with another continuous regular expression syntax in the plurality of regular expression syntaxes stored in the table unit.

9. The event notification management method according to claim 6, wherein the generating the series of notification data generates the series of notification data by repeating the joining process till the continuous regular expression syntax is not associated by the chain information with another continuous regular expression syntax in the plurality of regular expression syntaxes stored in the storage unit.

* * * * *

UNITED STATES PATENT AND TRADEMARK OFFICE
CERTIFICATE OF CORRECTION

PATENT NO.         : 7,908,524 B2
APPLICATION NO.    : 11/236534
DATED              : March 15, 2011
INVENTOR(S)        : Minegishi et al.

It is certified that error appears in the above-identified patent and that said Letters Patent is hereby corrected as shown below:

Title Page Item (75) (Inventors), Column 1 Line 3 delete "Kaebashi (JP)" and insert
-- Maebashi (JP) --, therefor.

Signed and Sealed this
Thirty-first Day of May, 2011

David J. Kappos
*Director of the United States Patent and Trademark Office*